(12) United States Patent
Witelson et al.

(10) Patent No.: US 10,843,106 B2
(45) Date of Patent: Nov. 24, 2020

(54) SELF CLEANING POOL CLEANER

(71) Applicants: Shay Witelson, Kibbutz Yizrael (IL); Boaz Ben Dov, Ram On (IL)

(72) Inventors: Shay Witelson, Kibbutz Yizrael (IL); Boaz Ben Dov, Ram On (IL)

(73) Assignee: MAYTRONICS LTD., Kibbutz Yizrael (IL)

(*) Notice: Subject to any disclaimer, the term of this patent is extended or adjusted under 35 U.S.C. 154(b) by 529 days.

(21) Appl. No.: 15/429,169

(22) Filed: Feb. 10, 2017

(65) Prior Publication Data

US 2018/0229160 A1 Aug. 16, 2018

(51) Int. Cl.
| | |
|---|---|
| *B01D 29/64* | (2006.01) |
| *E04H 4/16* | (2006.01) |
| *B01D 29/23* | (2006.01) |
| *B01D 29/60* | (2006.01) |
| *B01D 29/66* | (2006.01) |

(Continued)

(52) U.S. Cl.
CPC ......... *B01D 29/6415* (2013.01); *B01D 29/23* (2013.01); *B01D 29/601* (2013.01); *B01D 29/606* (2013.01); *B01D 29/66* (2013.01); *B01D 33/11* (2013.01); *B01D 33/461* (2013.01); *B01D 33/48* (2013.01); *B01D 33/805* (2013.01); *B01D 33/808* (2013.01); *C02F 1/001* (2013.01); *E04H 4/1654* (2013.01); *C02F 1/283* (2013.01); *C02F 2103/42* (2013.01); *C02F 2201/006* (2013.01); *C02F 2201/008* (2013.01); *Y10S 901/01* (2013.01)

(58) Field of Classification Search
CPC ...... B01D 29/23; B01D 29/35; B01D 29/114; B01D 29/668; B01D 29/52; B01D 46/0057; B01D 46/0058; B01D 29/6415; B01D 33/461; B01D 29/60; B01D 33/804; B01D 33/11; B01D 33/808; B01D 29/606; B01D 29/601; B01D 33/48; B01D 29/66; B01D 33/805; E04H 4/1654; E04H 4/12; E04H 4/1209; E04H 4/16; E04H 4/1663; E04H 4/1672; B25J 11/0085; B25J 9/1694; B25J 5/00; C02F 1/001; C02F 2103/42; C02F 2201/008; C02F 1/283; C02F 2201/006; C02F 1/006; C02F 2001/007; Y10S 901/01
USPC .......................... 210/167.16, 167.17; 15/1.7
See application file for complete search history.

(56) References Cited

U.S. PATENT DOCUMENTS

| | | | | |
|---|---|---|---|---|
| 4,100,641 | A * | 7/1978 | Pansini | ................ E04H 4/1654 |
| | | | | 15/1.7 |
| 8,434,182 | B2 * | 5/2013 | Horvath | ................ E04H 4/1654 |
| | | | | 15/1.7 |

(Continued)

*Primary Examiner* — David C Mellon
(74) *Attorney, Agent, or Firm* — Reches Patent

(57) ABSTRACT

A pool cleaner that may include a drive mechanism for moving the pool cleaner; a housing that has a first fluid opening and a second fluid opening; a filtering unit that comprises a filter enclosure and a filtering element; a fluid flow mechanism for inducing a flow of fluid through the filtering element in a first direction during a filtering process and for inducing a flow of the fluid through the filtering element at a substantially opposite direction during a backwash process; and a debris trap that is configured to receive debris from the filtering element during the backwash process and to substantially prevent the debris from exiting the debris trap during the filtering process.

53 Claims, 29 Drawing Sheets

(51) Int. Cl.
*B01D 33/11* (2006.01)
*B01D 33/46* (2006.01)
*B01D 33/48* (2006.01)
*B01D 33/80* (2006.01)
*C02F 1/28* (2006.01)
*C02F 1/00* (2006.01)
*C02F 103/42* (2006.01)

(56) References Cited

U.S. PATENT DOCUMENTS

| | | | | |
|---|---|---|---|---|
| 2011/0000036 | A1* | 1/2011 | Pichon | E04H 4/1654 15/1.7 |
| 2013/0032527 | A1* | 2/2013 | Calleri | B01D 29/33 210/413 |
| 2013/0152317 | A1* | 6/2013 | Erlich | B08B 9/08 15/1.7 |
| 2014/0014140 | A1* | 1/2014 | Correa | E04H 4/1654 134/34 |
| 2014/0076789 | A1* | 3/2014 | Shlomi-Shlomi | E04H 4/1654 210/195.1 |
| 2016/0051913 | A1* | 2/2016 | Witelson | B01D 29/23 210/143 |

* cited by examiner

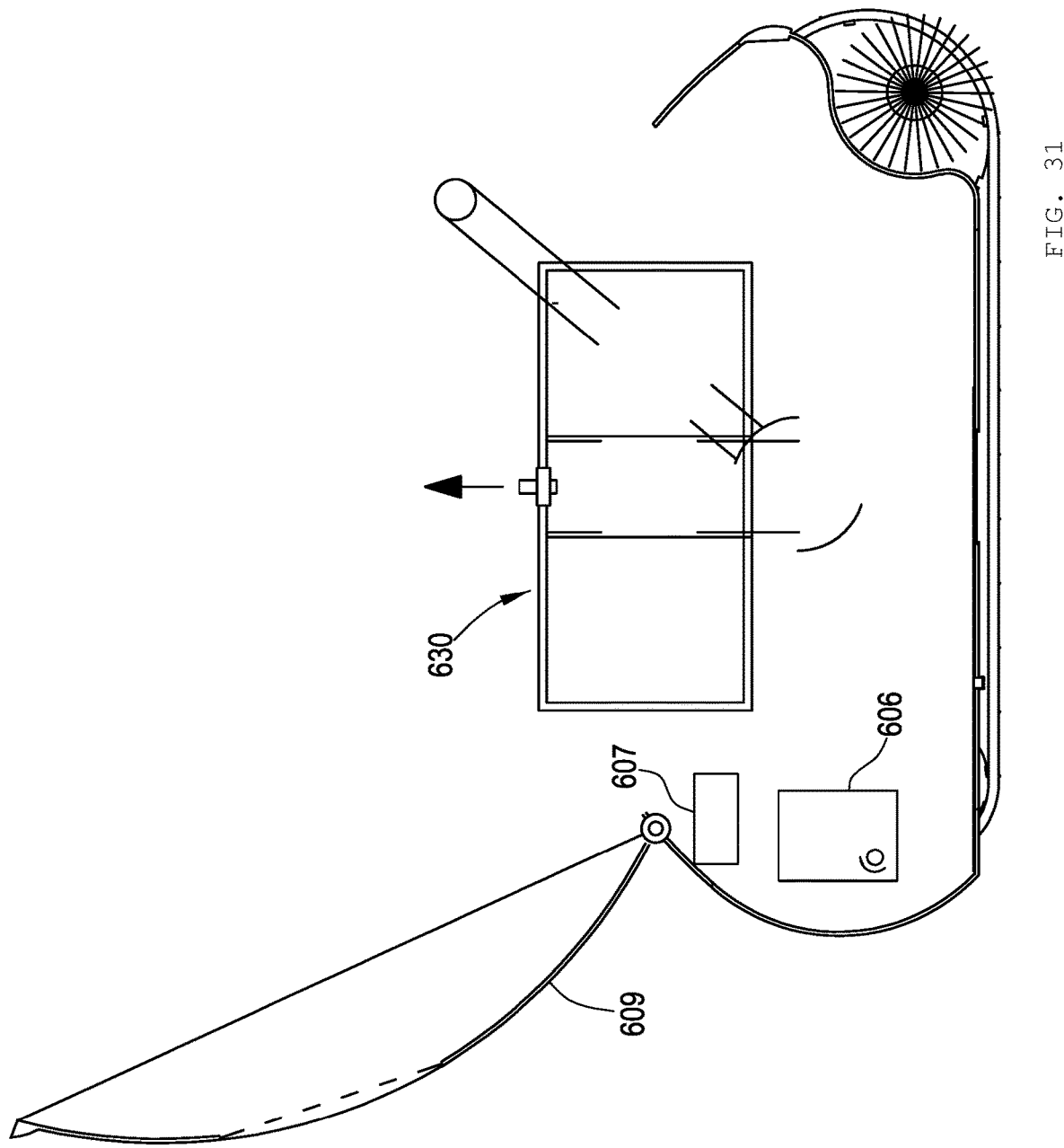

```
┌─────────────────────────────────────────────────────────────────────┐
│  Performing a filtering operation by a pool cleaner that includes a drive mechanism for │
│    moving the pool cleaner, a housing that has a first fluid opening and a second fluid │
│  opening, a filtering unit that includes a filter enclosure and a filtering element and a fluid │
│                            flow mechanism. 810                       │
└─────────────────────────────────────────────────────────────────────┘
                                    │
                                    ▼
┌─────────────────────────────────────────────────────────────────────┐
│             Performing a backwash process of the filtering unit. 820                │
│  ┌───────────────────────────────────────────────────────────────┐  │
│  │ Receiving, by a debris trap, debris from the filtering element during the backwash │  │
│  │                            process. 822                        │  │
│  └───────────────────────────────────────────────────────────────┘  │
└─────────────────────────────────────────────────────────────────────┘

SELF CLEANING POOL CLEANER

CROSS REFERENCE

This application claims priority from U.S. patent provisional patent Ser. No. 62/293,783 filing date Feb. 11, 2016 and claims priority from U.S. patent application Ser. No. 14/829,668 filing date Aug. 19, 2015 that claims priority from U.S. provisional patent Ser. No. 62/038,883 filing date Aug. 19, 2014.

BACKGROUND

Pool Cleaners commonly comprise of an enclosed hollow body that travels on wheels or tracks on the relative horizontal swimming pool surfaces; at least one brush to sweep the surfaces; at least two motors one of which drives the body on floor or walls; a pump motor that is positioned in a hydraulic system that draws water and debris from a bottom inlet opening in the said body where the said inlet is near or close to the travelled surfaces; said liquid passes through a filtering media and is subsequently ejected from the body from an upper positioned outlet opening.

The drawing through the bottom end of the body and the expelling of the water at the top end creates a negative pressure force at the bottom end to maintain the vehicle in contact with the underwater surface. Such a hydraulic system makes use of the suction port at the lower end of the body that also forms a negative pressure inside the body of the pool cleaner also called a vacuum pressure force.

The vacuum pressure force at the bottom of the pool cleaner coupled with the downward pressure created by the ejecting water that is being created will ensure that the pool cleaner remains in close contact to the floor or walls of the swimming pool.

The art depicts and describes numerous embodiments where said pump motor is positioned—in an upright position or in an angled position—having impeller blades located remotely from of the pool cleaner inlet usually at a higher region within the hydraulic system path in the hollow body. The effect is an impeller that by means of the high-speed rotation of its plastic or non-rust metal made blades (at about 2600-3000 rpm) draws the water with sufficient force to pull the water through the filtering mechanism.

Such a hydraulic suction system is effective but has drawbacks:
a. The hollow body is never quite sealed from the surrounding pool water. The vacuum or negative internal pressure that is created and described above also draws unclean water from various openings in the pool cleaner body contour (wheel or brush areas, handle arrangements, venting/mechanical non-return valve elements etc.). This also causes air to be drawn into the hollow body, especially when climbing on the pool wall at waterline level. The vacuum and the suction force may thereby be reduced, at times, causing the pool cleaner to disengage from the waterline and to float uncontrollably on the water surface.
b. It is necessary to employ a pump motor with propeller or impeller blades that have sharp edges and that are revolving at a very high speed. The propeller/impeller is potentially accessible to fingers or other objects through the inlets or outlets of the pool cleaner so that an incautious end user may insert a finger that will contact the sharp blades.
c. The common upward position of the pump/impeller motor creates a high center of gravity. This is particularly problematic when in a climbing position on the pool wall where a high moment of force for wall disengagement is created by the pump motor location.
d. In the hydraulic water path movement, the position of the impeller blades must be after the filtering mechanism in the hydraulic water flow path so that only filtered water will impact the revolving impeller blades. Any changes in this configuration i.e.: impeller blades before filtering element may cause blade breakage/dent that will reduce pump motor efficiency.
e. The removal of the impeller/propeller from the upper area of the internal hollow body creates a space for introduction of a water outlet cylinder that will counteract revolving filer unit rotation torque forces with a water outlet spiral mechanism.

SUMMARY

According to an embodiment of the invention there may be provided a pool cleaner with self cleaning filter mechanism and a high internal hydraulic system pressure as illustrated in the figures and specification.

According to an embodiment of the invention there may be provided a pool cleaner that may include a drive mechanism for moving the pool cleaner; a housing that has a first fluid opening and a second fluid opening; a filtering unit that may include a filter enclosure, a cleaning element and a filtering element; and a rotating mechanism that may be configured to introduce a relative rotation between the cleaning element and the filtering element thereby causing the cleaning element to clean the filtering element. The relative motion may be performed by moving only the filtering element, only the cleaning element, by moving both the filtering element and the cleaning element at the same time and/or by moving both the filtering element and the cleaning element at partially overlapping or non-overlapping time periods. The movement of the filtering element can be performed by moving the filtering element itself or by moving any element (such as but not limited to a filter enclosure) that is mechanically coupled to the filtering element. The movement of the cleaning element can be performed by moving the cleaning element itself or by moving any element (such as but not limited to a supporting element) that is mechanically coupled to the filtering element.

The pool cleaner may include a set of impeller blades that may include at least one impeller blade; wherein the rotation of the filtering element causes the set of impeller blades to rotate thereby inducing fluid to enter through the first fluid opening.

The pool cleaner may not include any impeller except the set of impeller blades.

The filter enclosure may include a filtering unit gear that meshes with the rotating mechanism; wherein the filtering unit gear is located in proximity to a bottom of the filter enclosure.

The filter enclosure may include a filtering unit gear that meshes with the rotating mechanism; wherein the filtering unit gear is located above an upper surface of the filter enclosure.

The cleaning element is coupled to a movement element that may be configured to rotate an interfacing portion of the cleaning element; wherein the interfacing portion may be configured to interface with an inner section of the filtering element during a cleaning of the inner section of the filtering element.

The movement element may be configured to rotate the interfacing portion of the cleaning element about an axis that is closer to a sidewall of the filtering element than to a center of the cleaning element.

The movement element may be configured to rotate the interfacing portion of the cleaning element about an axis that is proximate to a sidewall of the filtering element.

The movement element may be configured to rotate the interfacing portion of the cleaning element about an axis; wherein at least an upper portion of the axis is positioned above the filtering element; wherein the filtering element defines a gap that is at least partially sealed by a sealing element; wherein the axis passes through the sealing element.

The sealing element has an annular shape.

The interfacing portion is connected to an arm; wherein the interfacing portion is supported by the arm.

The movement element belongs to the rotating mechanism.

The movement element is mechanically coupled to the rotating mechanism.

The movement element is positioned within the filter enclosure.

The movement element is positioned outside the filter enclosure.

The cleaning element may include a vertical portion that interfaces with a sidewall of the filtering element.

The cleaning element is positioned at a fixed position during a cleaning of the inner section of the filtering element.

The cleaning element may include an interfacing portion for interfacing with an inner section of the filtering element, wherein the interfacing portion is coupled to a movement element that may be configured to move the interfacing portion in relation to the cleaning element thereby changing a distance between the interfacing portion and the filtering element.

The cleaning element may include an interfacing portion that is coupled to a movement element; wherein the movement element may be configured to move the interfacing portion between a first position in which the interfacing element interfaces with an inner section of the filtering element and a second position in which the interfacing element is spaced apart from the inner section of the filtering element.

The pool cleaner that may include multiple filtering elements and multiple cleaning elements for cleaning the multiple filtering elements.

The pool cleaner wherein a spatial relationship between at least a pair of cleaning elements remains unchanged.

The cleaning element may include an arm that may include a supporting element and an interfacing portion; wherein the interfacing portion may be configured to interface the inner section of the filtering element when cleaning the filtering element.

The cleaning element may include a rod and alternating fins that are connected to the rod; wherein the rod may be configured to rotate about a longitudinal axis of the rod when cleaning the filtering element.

The cleaning element may include a brush that is parallel to a sidewall of the filtering element.

The cleaning element may include a brush that is oriented in relation to a sidewall of the filtering element.

The cleaning element may include a brush that may be configured to interface with a sidewall and a bottom of the filtering element.

The filtering unit is radially symmetrical and wherein the first fluid opening is positioned at a center of the filtering unit.

The pool cleaner may include a hydraulic system that may be configured to direct fluid from the first fluid opening towards the second fluid opening; wherein the rotating mechanism and the hydraulic system share a motor.

The pool cleaner, wherein the cleaning element may include a cleaning element core and an interfacing portion that extends from the cleaning element core and interfaces with the filtering element; wherein the cleaning element core may include multiple cleaning element core apertures; wherein the filtering element may be configured to filter fluid that enters via the first fluid opening, passes through the multiple cleaning element core apertures and exits through the second fluid opening; and wherein the rotating mechanism may be configured to rotate the cleaning element core.

The rotating mechanism may be configured to simultaneously rotate the filtering element and the cleaning element core.

The rotating mechanism may be configured to rotate the filtering element and the cleaning element core in a mutual independent manner The interfacing portion may include multiple bristles.

The multiple bristles are positioned along a spiral path.

The interfacing portion may include a continuous spiral element.

The interfacing portion may include a non-continuous spiral element.

According to an embodiment of the invention there may be provided a pool cleaner that may include a drive mechanism for moving the pool cleaner; a housing that has a first fluid opening and a second fluid opening; a filtering unit that may include a filter enclosure, a filtering element, an apertured filter core; and a cleaning element for cleaning the filtering element; wherein the cleaning element may include an interfacing portion that interfaces with the filtering element; a rotating mechanism that may be configured to rotate the filter enclosure; and a movement mechanism that may be configured to rotate the apertured filter core.

The rotating mechanism may be configured to rotate the filter enclosure regardless of the rotation of the apertured filter core.

The pool cleaner further may include a set of impeller blades that may include at least one impeller blade.

The set of impeller blades are mechanically coupled to the filter enclosure.

The set of impellers is mechanically coupled to the apertured filter core.

The pool cleaner that may include multiple filtering elements and multiple cleaning elements for cleaning the multiple filtering elements.

The pool cleaner wherein a spatial relationship between at least a pair of cleaning elements maintains unchanged According to an embodiment of the invention there may be provided a pool cleaner that may include a drive mechanism for moving the pool cleaner; a housing that has a first fluid opening and a second fluid opening; a filtering unit that may include a filter enclosure and a filtering element and a cleaning element for cleaning the filtering element; a debris trap; wherein the debris trap and the filtering element are fluidly coupled to each other by a unidirectional flow element that facilitate a flow of debris from the filtering element to the debris trap and prevents a flow of debris from the debris trap to the filtering element.

The pool cleaner may include a cleaning element and a rotating mechanism that may be configured to rotate the filter enclosure, thereby causing the cleaning element to clean an inner section of the filtering element.

The uni-directional flow element is closer to a sidewall of the filtering element than to an axis of rotation of the filtering element.

The cleaning element is positioned within the filter enclosure.

The cleaning element may be configured to constantly clean the filtering element.

The cleaning element may be configured to clean the filtering element in a non-continuous manner The pool cleaner may include a sensor for sensing when the filtering element is clogged to a predefined level and to trigger a cleaning of the filtering element by the cleaning element.

The pool cleaner may include a sensor for sensing when the filtering element is clogged to a predefined level and to trigger a mode of receiving a flow of debris from the filtering element to the debris trap.

The pool cleaner may include a sensor for sensing when the filtering element is clogged to a predefined level and to trigger a simultaneous cleaning of the filtering element by the cleaning element and a mode of receiving a flow of debris from the filtering element to the debris trap.

The pool cleaner may include multiple uni-directional flow elements.

The uni-directional flow element is a uni-directional valve.

The debris trap has elastic sidewalls that are configured to expand when the debris trap rotates.

The debris trap may be configured to expand when receiving the debris and to contract when not receiving the debris.

BRIEF DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

FIG. 31 is a cross section of a pool cleaner according to an embodiment of the invention; and FIG. 32 illustrates a method according to an embodiment of the invention.

DETAILED DESCRIPTION OF THE DRAWINGS

Figure 1:
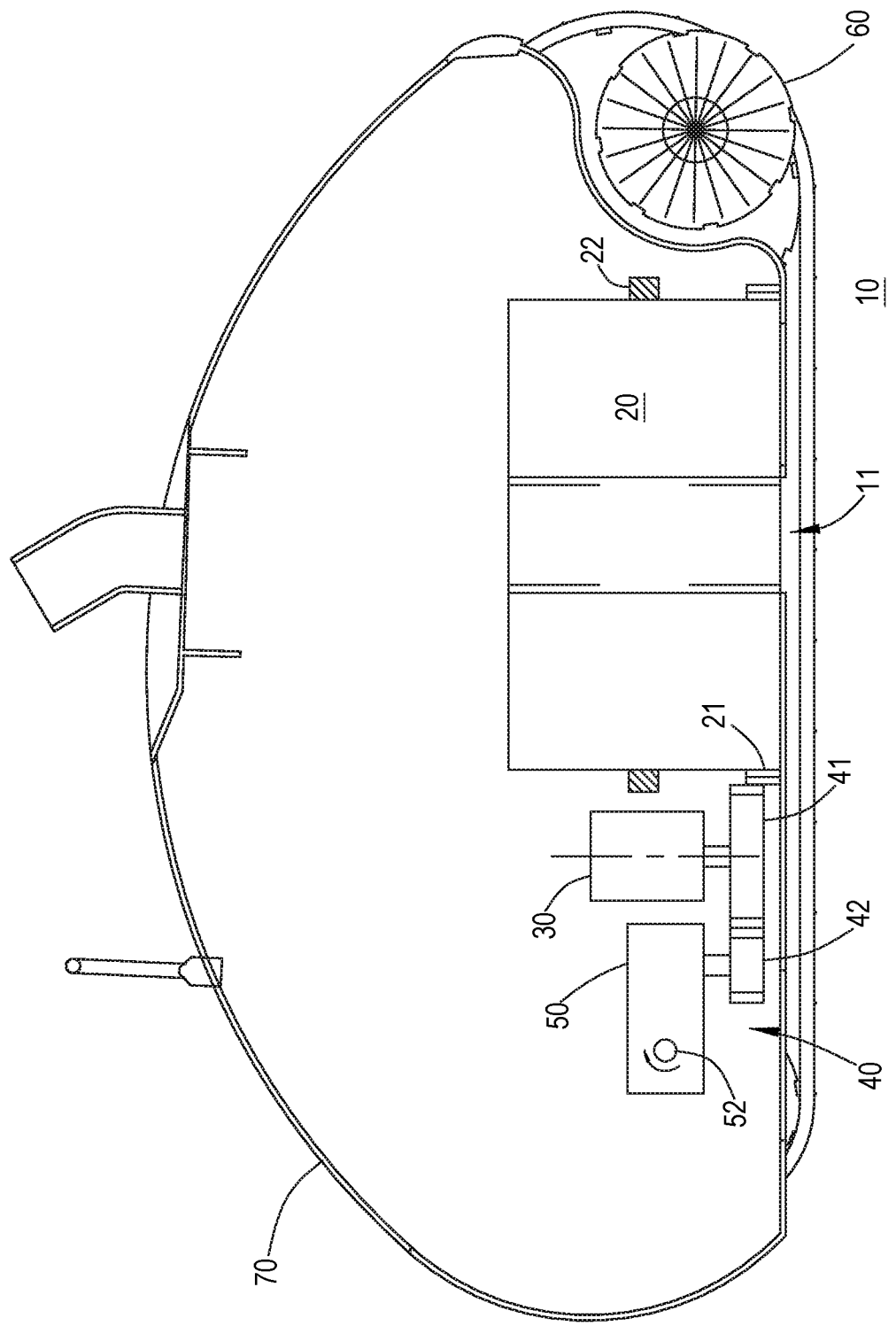
FIG. 1 is a cross sectional view of a pool cleaner according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terms "spindle", "axis" and "axe;" are used in an interchangeable manner.

The terms" system", "unit", "mechanism" and "arrangement" are used in an interchangeable manner.

The term "comprising" is synonymous with (means the same thing as)" including," "containing" or "having" and is inclusive or open-ended and does not exclude additional, unrecited elements or method steps.

The term "consisting" is a closed (only includes exactly what is stated) and excludes any additional, unrecited elements or method steps.

The term "consisting essentially of" limits the scope to specified materials or steps and those that do not materially affect the basic and novel characteristics.

In the claims and specification any reference to the term "comprising" (or "including" or "containing") should be applied mutatis mutandis to the term "consisting" and should be applied mutatis mutandis to the phrase "consisting essentially of".

For example, any filtering unit illustrated in any of the figures can be limited to the components illustrated in the figures, can also have unspecified elements that do not materially affect the basic and novel characteristics or may have additional, unrecited elements.

For example, any pool cleaner illustrated in any of the figures can be limited to the components illustrated in the figures, can also have unspecified elements that do not materially affect the basic and novel characteristics or may have additional, unrecited elements.

In the claims and specification any reference to the term "consisting" should be applied mutatis mutandis to the term "comprising" and should be applied mutatis mutandis to the phrase "consisting essentially of".

In the claims and specification any reference to the phrase "consisting essentially of" should be applied mutatis mutandis to the term "comprising" and should be applied mutatis mutandis to the term "consisting".

Any reference in the specification to a method should be applied mutatis mutandis to a system capable of executing the method.

Any reference in the specification to a system should be applied mutatis mutandis to a method that may be executed by the system.

The term "substantially" or "about" can refer to an accuracy (or deviation) of any value between 1 and 20 percent.

The term "proximate" may refer to a range of distances that may span, for example, between a fraction of a millimeter and less than 5 centimeters.

Any combination of any components of any of the pool cleaners illustrated in any of the figures may be provided.

Any pool cleaner (or filtering unit) that is illustrated in a figure may include additional components, may include alternative components, may include fewer components, may be limited to the components illustrated in the figure or may be essentially limited to the components illustrated in the figure.

For example, any filtering unit that is illustrated as including a single filtering element may include two or more filtering elements.

For example, any filtering unit that is illustrated without a set of impeller blades may include a set of impeller blades.

For example, any filtering unit that is illustrated with a set of impeller blades may exclude a set of impeller blades.

For example, any filtering unit that is illustrated as including an interfacing element (of a cleaning element) that is a brush may include (in addition to the brush or instead of the brush) another interfacing element such as but not limited to a bar, a rotating rod connected to plates, and the like.

For example, any pool cleaner that includes a filtering unit that includes a set of impeller blades may include an additional impeller or may be limited only to the set of impeller blades.

For example, any filtering unit, may include a debris trap.

Figure 18:
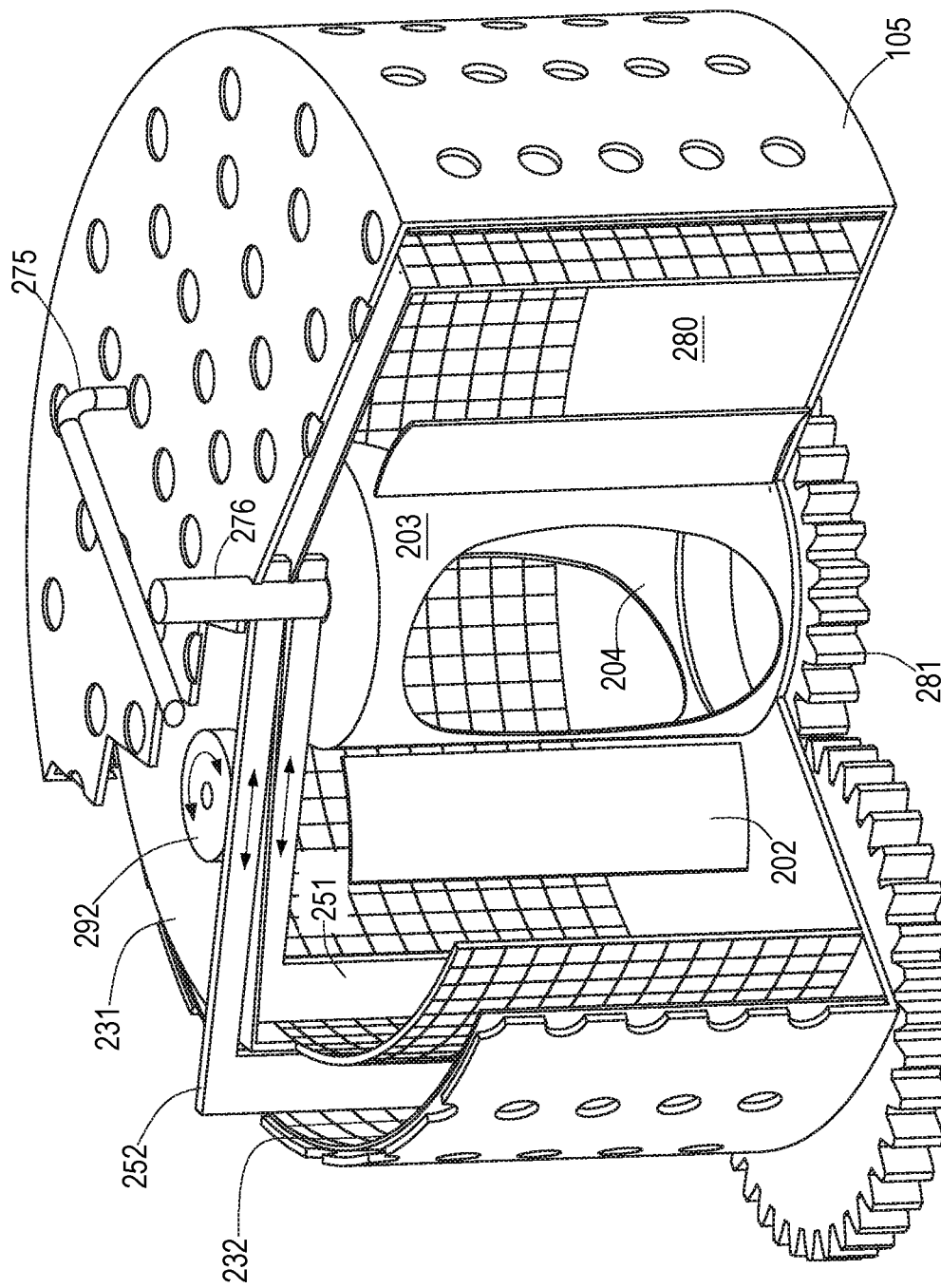
FIG. 18 illustrates a filtering unit that includes cleaning elements and a set of impeller blades according to an embodiment of the invention.
Figure 19:
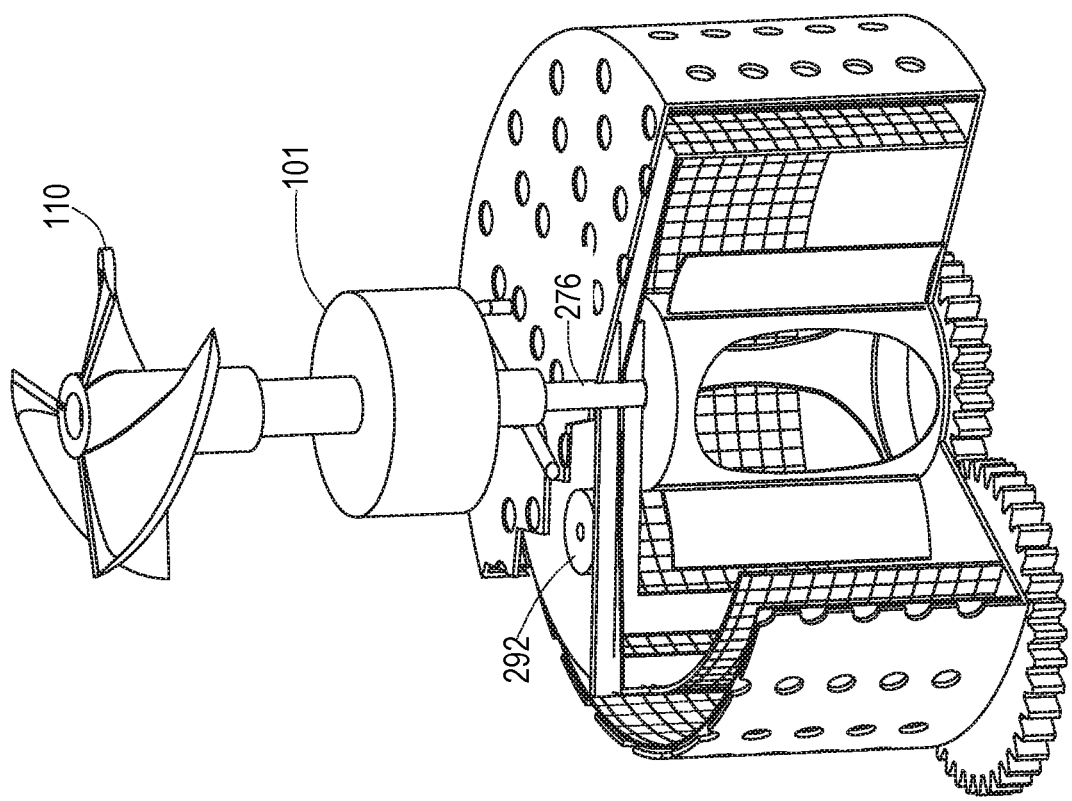
FIG. 19 illustrates a filtering unit that includes cleaning elements and a set of impeller blades according to an embodiment of the invention.

Yet for another example, every filtering unit that includes a cleaning element that has an interfacing portion (such as a brush, a rod, a scrapper, an arm) that contacts a filtering element may, as illustrated in FIGS. 18 and 19, include a movement element that is configured to automatically move the interfacing portion in relation to the cleaning element thereby changing a distance between the interfacing portion and the filtering element. Especially, the movement element 292 may be configured to move the interfacing portion between a first position in which the interfacing element interfaces with an inner section of the filtering element (and may clean the filtering element) and a second position in which the interfacing element is spaced apart from the inner section of the filtering element (and does not clean the filtering element). The movement element may be actuated by, for example, a motor and a gear that may move the arm in a radial movement, may rotate the interfacing portion, and the like. Movement element 292 may form part of, for example, motor 101 and/or rotor 102. Such a movement element may contribute to a non-continuous cleaning operation.

In FIG. 19 for example, cleaning elements 251 and/or 252 may each move separately or in tandem in a clockwise (CW) motion or in either an alternating anti-clockwise motion (CCW). Such a CW or CCW motion may revolve around the entire circumference of the filtering element or just a part thereof. It may intermittently revolve and clean only a smaller section of the said filtering element circumference, then stop, reverse direction and backtrack whereby the cleaning element alternately move back and forth each cleaning sections of the filter element(s).

According to various embodiments of the invention the above drawbacks are remedied by at least one of the following:

a. creating an internal positive pressure;
b. eliminating a potentially sharp and harmful blade or blades;
c. lowering the center of gravity of the impeller and thereby creating a lower momentum of force against wall disengagements; and
d. positioning the impeller blades at the more advantageous position as close as possible to the point of water entry into the hydraulic path inside the hollow body without the risk of blade breakage or blade denting; a more effective and efficient water outlet mechanism.
e. Saving on costs by employing filtering unit integrated impeller blades that may rotate at substantially lower rpm thereby reducing wear and tear as opposed to pumping mechanisms employing high rpm pumps.

According to a first embodiment of the invention the impeller blades and the filtering unit mechanism are combined into one single revolving unit that is positioned at the inlet or point of water entry into the hollow body hydraulic system path.

FIGS. 1-6 are cross sectional views of pool cleaners 10 according to embodiments of the invention.

Some of these figures illustrate a pool cleaner that includes a filtering unit. It is noted that the figures may be out of scale (or in scale). For example—an actual size of the filtering unit in various figures may be bigger or smaller than what is shown in various figures.

In FIGS. 1-6 a single drive motor system with a transmission mechanism (such as gears) is configured to rotate both the filter unit and the driving wheels of the cleaner can also be seen. One or more additional motors may be used. For example—one or more motors may be included in a rotating mechanism for rotating the filtering unit or the spinning around its own axis of a cleaning element while one or more motors may belong to a driving mechanism for moving the pool cleaner.

FIG. 1 illustrates a pool cleaner 10 having a housing 70. The filtering unit 20 is positioned above an inlet 11 located at the bottom of housing 70.

The filtering unit 20 has a gear 21 (filtering unit gear) that meshes with a first gear 41 that is rotated by motor 30. The first gear 41 also meshes with a second gear 42 of a portion 50 of transmission system 40 that converts the rotation of the motor to a rotation of an element (such as axis 52) of a pool cleaner drive system that moves the pool cleaner.

It is noted that any transmission system may be used for converting the rotation of motor 30 to a rotation of the filtering unit 20 and/or rotation of an element of the drive system (such as a rotation of a wheel, a set of wheels or a brushwheel 60).

Gear 21 is located at the lower part of the filtering unit and in proximity (for example 0.1-50 millimeters) to the bottom of the housing. Gear 21 can be positioned at other locations. Interfacing elements 22 (such as rotating cylinders) assist in maintaining the filtering unit at the same position despite the rotation of the filtering unit. The interfacing elements may be connected to the housing or to any other elements of the pool cleaner.

Motor 30 and transmission system 40 are near the bottom of the housing.

The transmission system 40 and/or motor 30 may be encapsulated within a water sealed box that may also comprise an electronic computerized control unit (not shown).

Figure 2A:
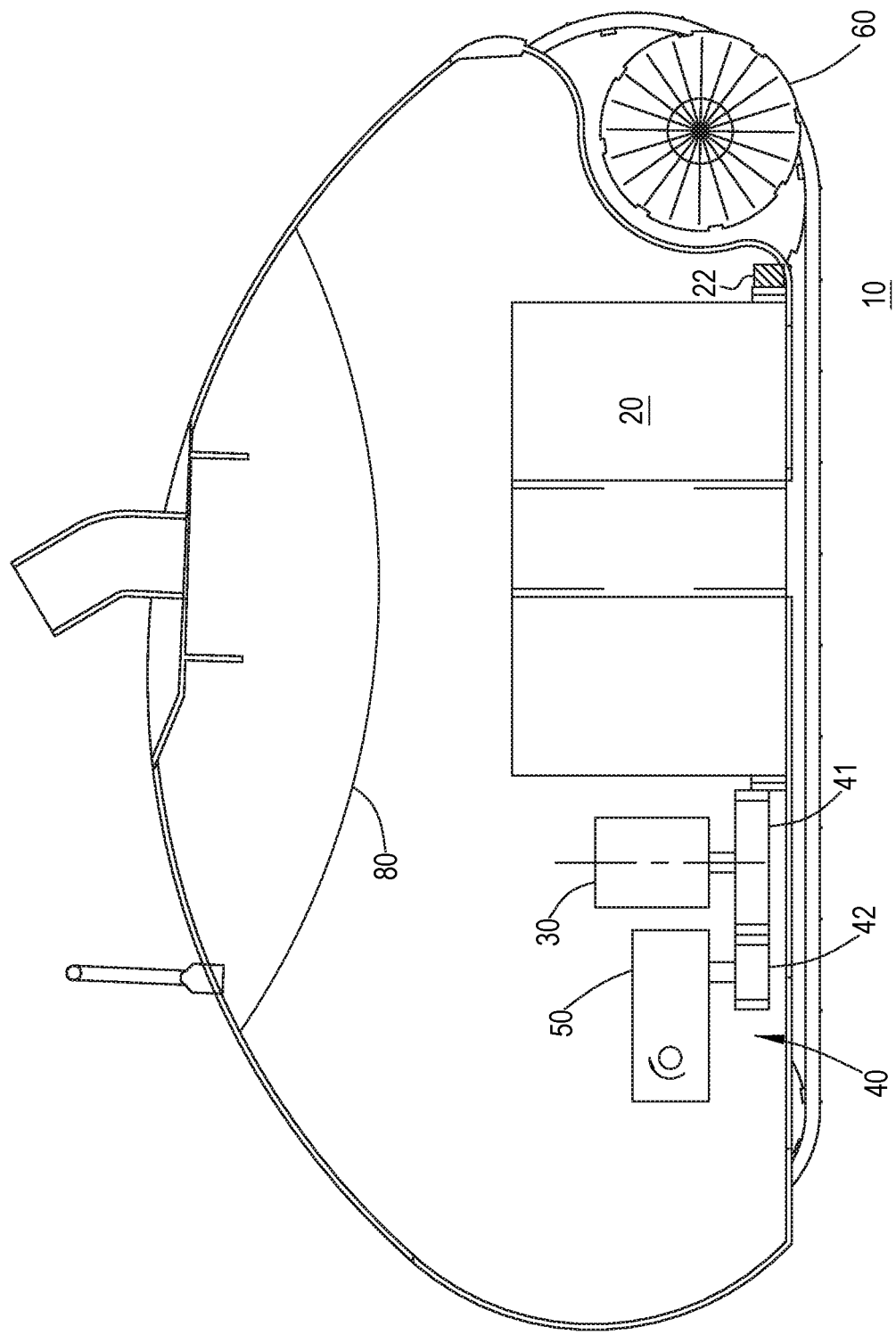
FIG. 2A is a cross sectional view of a pool cleaner according to an embodiment of the invention.

FIG. 2A illustrates a pool cleaner 10 in which the interfacing elements 22 are not positioned directly above gear 21 but are positioned such as to mesh with gear 21 without preventing the filtering unit 20 from being extracted from the upper portion of the housing—after removing or moving an upper removable lid 80 that can be removed or moved for extracting the filtering unit 20

Figure 2B:
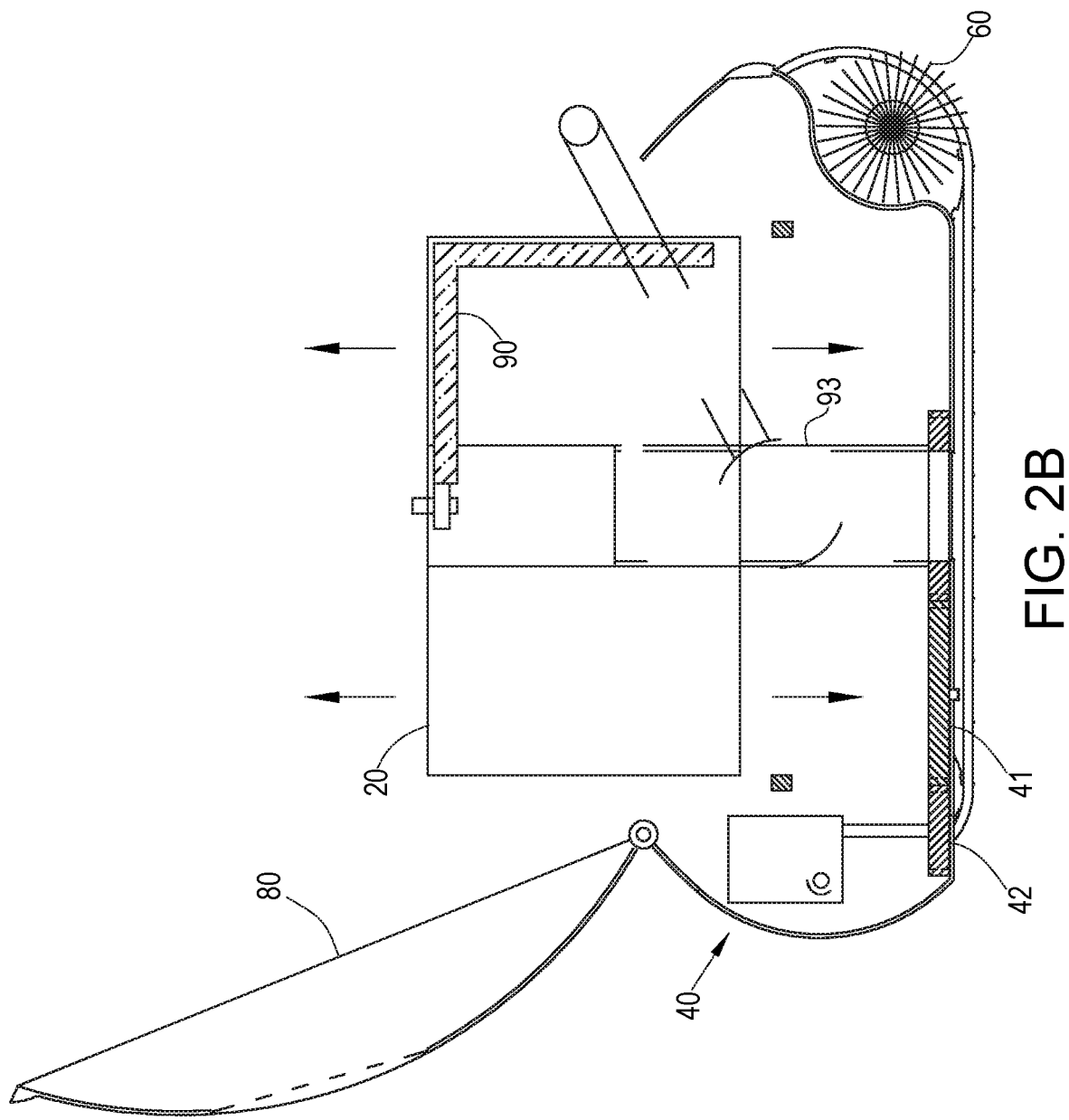
FIG. 2B is a cross sectional view of a pool cleaner according to an embodiment of the invention.

FIG. 2B illustrates a pool cleaner 10 with the upper removable lid 80 that in an open position for extracting the filtering unit 20 from the upper portion of the housing.

Figure 3:
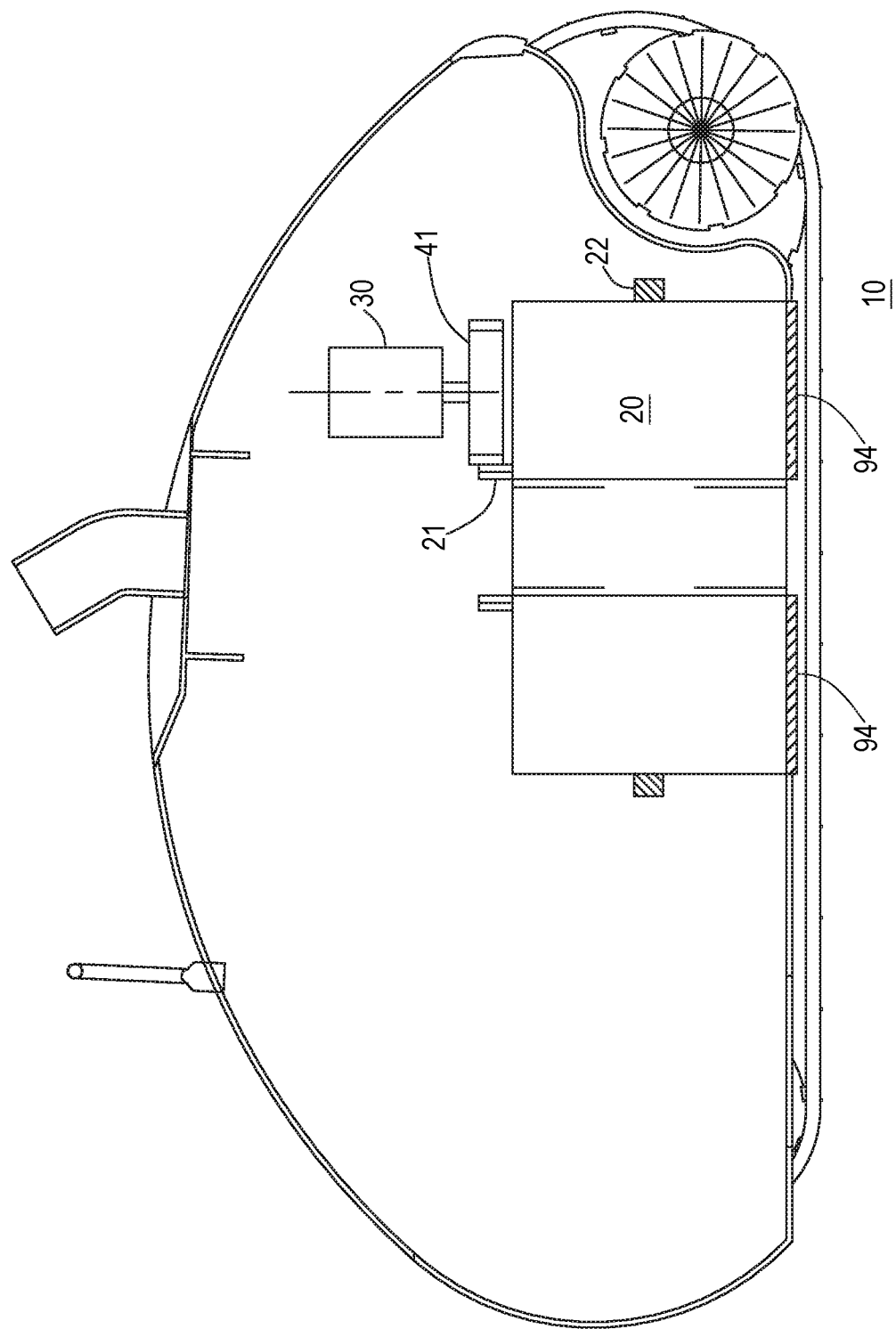
FIG. 3 is a cross sectional view of a pool cleaner according to an embodiment of the invention.

FIG. 3 illustrates a pool cleaner 10 in which the motor 30 is positioned above the filtering unit 20 and the first gear 41 meshes with gear 21 that is located at the top of the filtering unit 20. Rotating mechanism 40 and the hydraulic system space, between 11 and 14 in FIGS. 6 and 17, may share one or more motors. FIG. 3 illustrates a bottom 94 of the filtering unit. The bottom as well as the entire filtering unit 20 with or without filter enclosure 105 may be extracted from the pool cleaner.

FIG. 3 depicts an embodiment in which the filtering unit may be extracted from the bottom portion of the housing whereby the bottom of the filtering unit is snugly and sealingly positioned within the hollow bottom aperture and flush in relation to the bottom of the housing 70 that comprises a filter enclosure locking and securing latch (not shown)

In any of FIGS. 1-6, 8, 9, 10, 11, 12, 13, 15 and 17 the filtering unit may include internal Impeller blades and multi layered filter screens such as illustrated in PCT Patent Application No. PCT/IL2013/051055 titled AUTONOMOUS POOL CLEANER and which is herein incorporated in its entirety.

The filtering unit may be extracted from the bottom of the pool cleaner—as illustrated in PCT Patent Application No. PCT/IL2013/051055 titled AUTONOMOUS POOL CLEANER and which is herein incorporated in its entirety.

The filtering unit may be rotated by means of a separate motor positioned above (depicted here is a gear motor). The pool cleaner provides an extended use of a pool-cleaning filter by maintaining a viable and potent internal pressure.

Another major problem for reduced internal pressure is the frequent clogging of a filtering element of the pool cleaner. This has specific bearing on the proposed additional solution of an internal self-cleaning mechanism that is described below.

In general, such filtering assembly systems replace the more common Pump motor or impeller motor mounted blade impellers. The present internal blades may be rigid and come in direct contact with incoming debris and water. The filtering unit comprises of said internal blades and it is in contact at its center with a spindle or a shaft of a drive/pump motor. The said drive/pump motor may be combined into a single motor that may also include a transmission system and an electronic control system with linkage to sensors or actuators. Alternatively, the common, costlier configuration of at least two dedicated motors: drive and/or pump motors may still be used without losing the main advantages of the present invention.

The external periphery of the filtering unit can be made of one or more filtering elements or a filter enclosure. Each filtering element may be a mesh net or a series of such nets that partially surround each other and may, for example, be positioned one after the other in the hydraulic path in a series that filters large debris and thereafter, smaller size debris and a final net with small pores to filter fine dust.

The filtering elements may be serviceable (cleaning/washing) or replaceable or disposable. The nets may be constructed of metal or plastic, paper, carbon based fibers or a combination of these. The nets may be made of woven fiber mesh, non-woven mesh, polymer, textile, paper, carbon based fibers, or combinations thereof. Filtering elements can have different configurations—for example coarser filtering elements at the beginning of a swimming season and finer filtering elements as the swimming season progresses.

The filtering unit may have different filtering elements (such as different segments) that differ from each other—for example by the size of their pores—the first coarse section with large pores is used to filter larger debris for the beginning of the season, and the rest, finer section, to filter cleaner pool water and surfaces.

The cleaning element may prove most beneficial for a filtering element that may specifically comprise carbon nano-tube yarns and a warp and weft configuration generally employing nano-technology that may solve the negative problem of the ratio between actual yarn's strand thickness and the pore sizes that form a filter textile architecture. Amongst other possible developers, filters developed by, for example, Argonide Corporation USA, are a new type of water filter media combining the proven benefits of standard filters with nano-technology to create a unique filter possessing removal capabilities well beyond the scope of conventional filtration technologies. Besides reduced pore sizes, utilizing additional principles such as for example, electro-adhesion, it becomes possible to remove a wide range of water borne contaminants including bacteria, cysts, viruses and colloidal particles; It may utilize 2 to 3 micron nominal pore size to trap particles between 0.5 and 2 microns and combine this with the electro-adhesion to trap fine and ultra-fine particles down to a 0.02 microns. This combination of physical filtration and/or electro-adhesion results in a filter with higher removal and filtration capacities. Such minute size pores that may be used in pool cleaners and/or swimming pools may benefit by the accommodation of a filtering element or media self-cleaning mechanism that forms part of the present invention.

The revolving filtering unit centrifugally pushes the incoming water, debris, and dirt onto the periphery of the filtering mechanism thereby leaving an empty unused space at the center of the filtering unit that causes the drawing of the water from the water inlet. The filtered water traverses the filtering media, nets or mesh en route to the evacuation point at the pool cleaner outlet, for example, in the upper section of the housing 70. At the inlet, there is positioned a one-way non-return valve mechanism that prevents water from returning to the pool water. The valve opens by the suction power that is created by the suction force.

The inlet may also contain chopping elements that will reduce large leaves or other debris to "digestible" sizes (not shown).

In contrast with pressure side automatic pool cleaners (APC) that are well known in the art and focusing here only on the specific context of electrical APC, the above described configuration and hydraulic system create—as a main object of this invention—a high positive internal pressure inside of the hollow body and not a low negative internal vacuum based pressure. The drawbacks of a low negative internal vacuum system are described above. Due to the proximity of the pump motor and Impeller integrated arrangement to the water inlet (usually at the bottom of the hollow body), the incoming water is pushed and pressed inside the hollow body of the pool cleaner. By comparison, when an impeller is placed closer to the water outlet (usually at the top of the hollow body) the drawn-in water is pulled inside and due to the subsequent internal vacuum created, the drawing of water is occurring not just from the inlet but also from any other opening in the hollow body, thus causing a loss of suction power and ingression of dirt and debris. The present invention ensures that the water drawn-in from the bottom inlet and pushed out through the filter(s) onto the outlet does so without losing any suction power. The pool cleaner will adhere to the pool surface by both the sheer suction pressure that is created at the inlet point and with the downward pressure created by the evacuating water at the outlet.

An electronic digital communication from the control box is enabled by means of an electrical cord to the Power Supply outside the pool. Another embodiment calls for a battery operated pool cleaner that may provide the electrical energy and also communicate with the end user by means of a floating buoy connected to the control box by means of a dedicated cable that may emit radio messages to the said power supply receptors.

In any embodiment, the emitting—directly or indirectly via power supply—can be communicated to the Smartphone of the end user.

Another embodiment of a battery or cordless operated type pool cleaner may identify and navigate to an underwater docking station (wet station) on which it may be able to electronically control the automatic replacement of the said filtering unit while conductively charging its batteries underwater.

In other embodiments, the pool cleaner may climb or be automatically lifted or hoisted out of the pool water in order to identify and navigate to an external (dry land) docking station on which it will perform a filtering replacement procedure while charging its batteries.

In both above embodiments (motors located at the bottom of the hollow body or in the upper section or two motors split apart) the entire filtering unit is removable for servicing and may be removed from the bottom or from the top section of the housing. The top section may be secured by a lid. The lid may be a removable lid, may be detachably coupled to other parts of the housing, may rotate about an axis to expose the interior of the pool cleaner, and the like. A bottom filter removal version may be manually secured by a latch (not shown).

FIGS. 2A-2B illustrates a lid 80 of the housing 70 that may be positioned in a first position in which lid 80 and other parts of the housing form a substantially closed housing and may be positioned (for example by rotation about an axis) at a second position in which the interior of the housing is exposed and the filtering unit 20 may be extracted through an opening defined by the lid.

By pressing onto the bottom filter base plate (not shown) that will release the filtering mechanism from the axis/spindle/perforated cylinder (denoted 93 in FIGS. 2B and 14, 160 in FIG. 16 or 203 in FIG. 18) that may be held in place using a spring loaded clip mechanism. The reverse is performed by pressing the filtering unit back and clicking it back into place. Such a releasing and mounting mechanism may also be used for a top loading configuration but a removable lid (hinged or not hinged) may comprise indentations or ribs that may hold and lock the filtering unit in place.

The spindle may be connected to a drive motor by means of a gear or it may be connected directly as an extension of the drive motor spindle. The said drive motor may be the traditional low RPM drive motor (for example, 50-52 RPM) or the fast revolving pump motor mentioned above in conjunction of gears.

The removal and reinsertion of the filtering unit may also be actuated automatically by means of a releasing actuator that disengages the filtering unit from the main spindle and lets it slide downward to be grabbed by a manipulator that—after filter removal—will reinsert a new filtering unit and click it into place.

The filtering unit operation and automatic evacuation or reinsertion and the motor or motors—are governed by means of an electrical control unit that is placed in a watertight compartment. This control unit oversees the motors scanning and operating program that is stored in the memory chip. It also controls the sensors that are placed inside the cleaner to identify and advise the user that the filtering unit needs manual or automatic servicing or send the user any data or information relating to the pool cleaner performance or swimming pool conditions.

The Self Cleaning Filter Embodiment

As stated above, there may be provided filtering units with at least one or sets of self-cleaning—revolving or static brush (or brushes) or one or more scraper mechanisms—that continually or intermittently brush the net surfaces in order to expose new tracts of the filtering net by the brushing effect and water turbulence near the surface of the filter net or filter nets. FIGS. 8-16 illustrates cleaning elements of various types (inverted L shaped arm 90 of FIG. 8, rotating rod connected to plates (such as alternating plates) to form cleaner 100 of FIGS. 9 and 10, vertical brushes 131 and 143 of FIGS. 11 and 13), double arm 92 of FIG. 15, blades 150 of FIG. 14, curved brush 142, a cleaning element core such as inner cylinder 160 that is connected to brushing elements 161 and has holes 162) that are used to interface with inner portions of a filter and clean it. These cleaning elements may be rotated or moved by an on-axis movement element (engine 101, turbine or impeller 110) that has a rotation axis that is located at the center of the filter (see FIGS. 10, 12, 13, 15 and 16) or moved by off-axis movement element (rotor 102 of FIGS. 9 and 11). The cleaning element may rotate about the axis of the movement element (FIG. 16), by located off-axis of the axis—but connected by an arm (141 of FIGS. 12 and 13) or to a gear (gears 282 and 281 of FIG. 19), may be connected to the rotating element via the center of the filter (FIGS. 8, 12-15) or via gap between the filter and the filter cover (gap 104 of FIG. 9, see also FIGS. 10 and 11).

Figure 8:
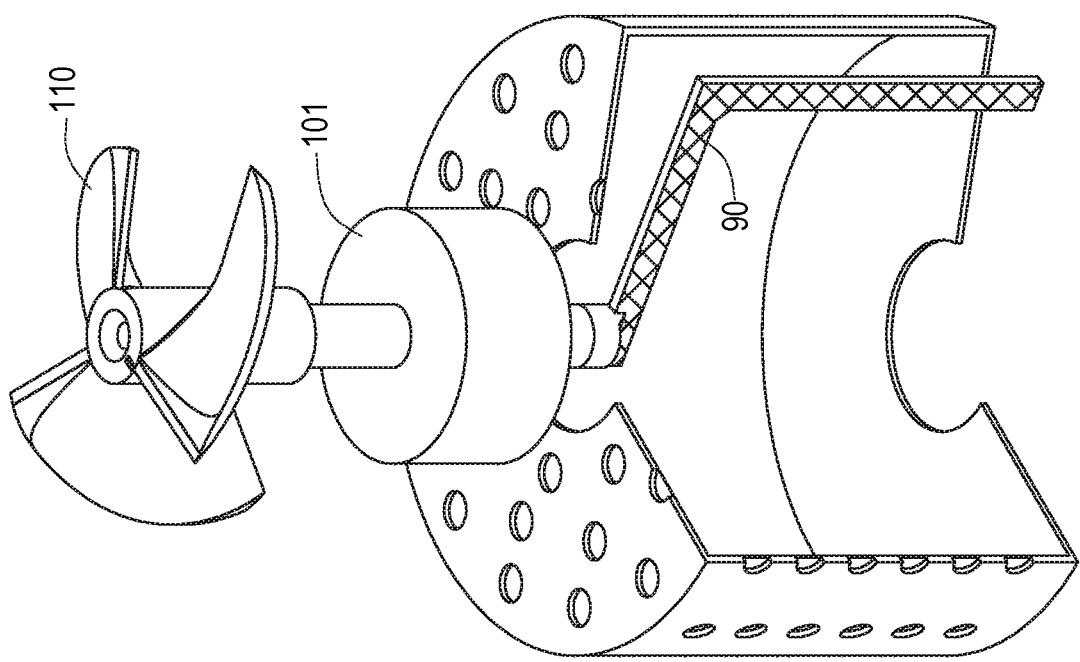
FIG. 8 illustrates a filtering unit that includes a cleaning element, a movement element and an impeller according to an embodiment of the invention.
Figure 11:
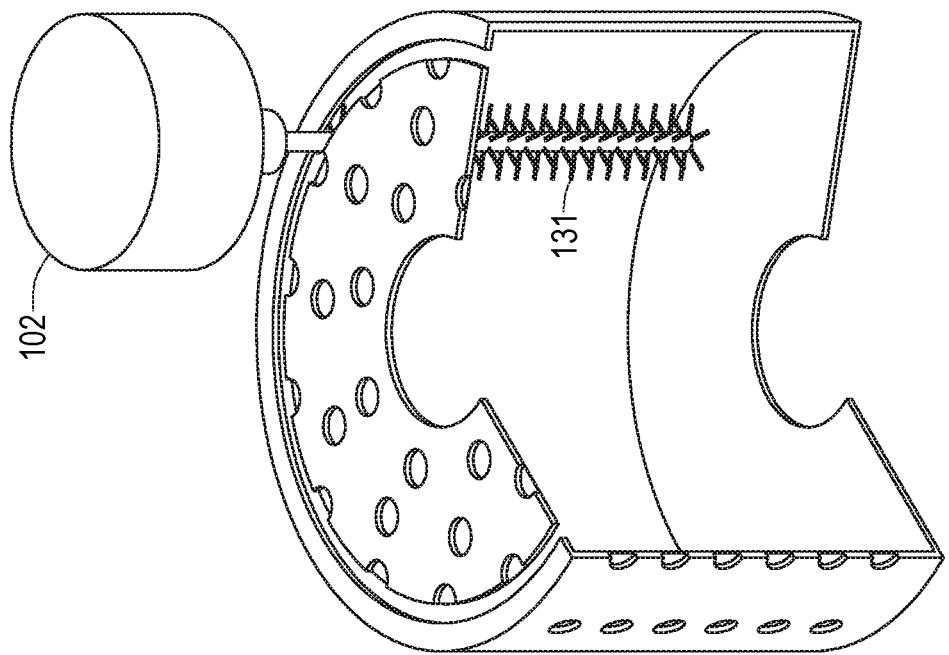
FIG. 11 illustrates a filtering unit that includes a cleaning element, and a movement element according to an embodiment of the invention.

FIG. 8 illustrates an embodiment whereby a movement element and an external impeller location employing a static non-rotating filtering element; whereby a cleaning element may continuously or intermittently rotate along the filtering unit internal perimeter that is controlled from a control box (not shown) included with engine 101; and whereby the filter enclosure or the filtering elements (not shown) may be extracted for servicing from a bottom opening of the housing.

Figure 9:
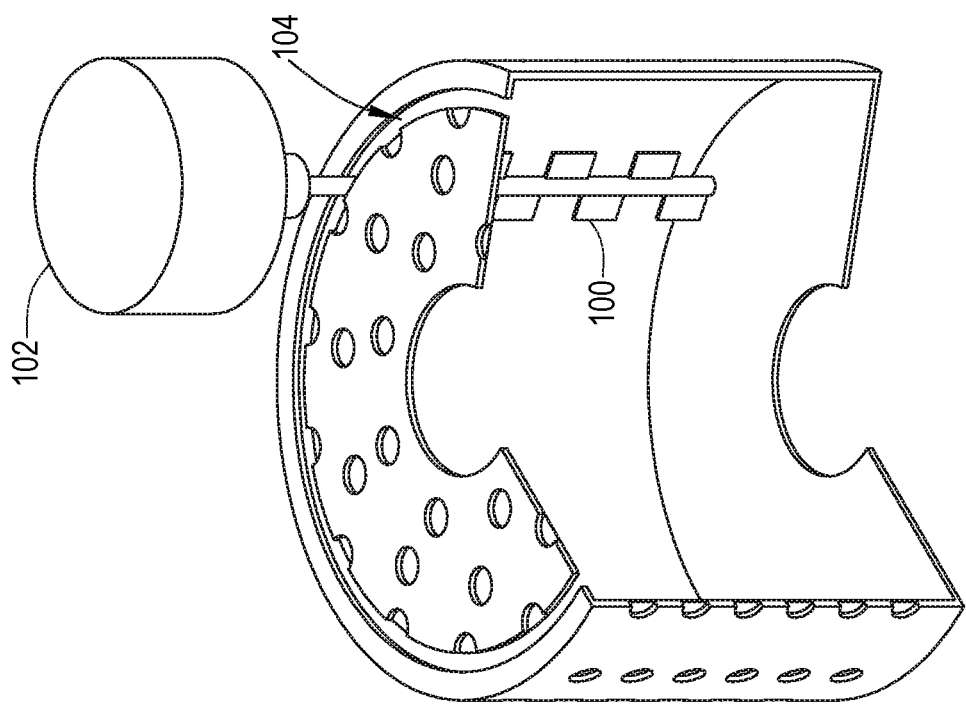
FIG. 9 illustrates a filtering unit that includes a cleaning element and a movement element according to an embodiment of the invention.
Figure 10:
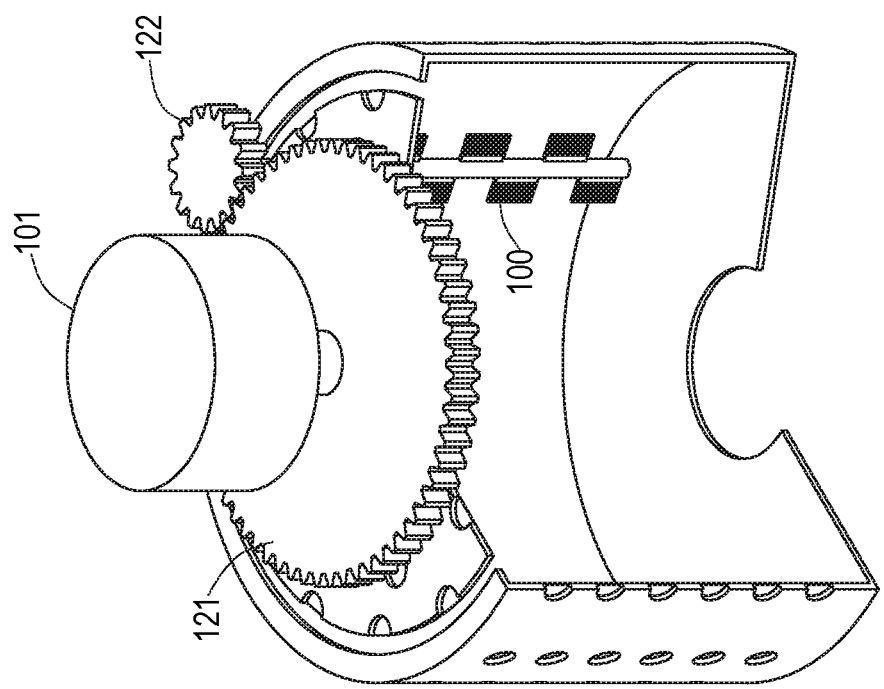
FIG. 10 illustrates a filtering unit that includes a cleaning element, and a movement element according to an embodiment of the invention.
Figure 13:
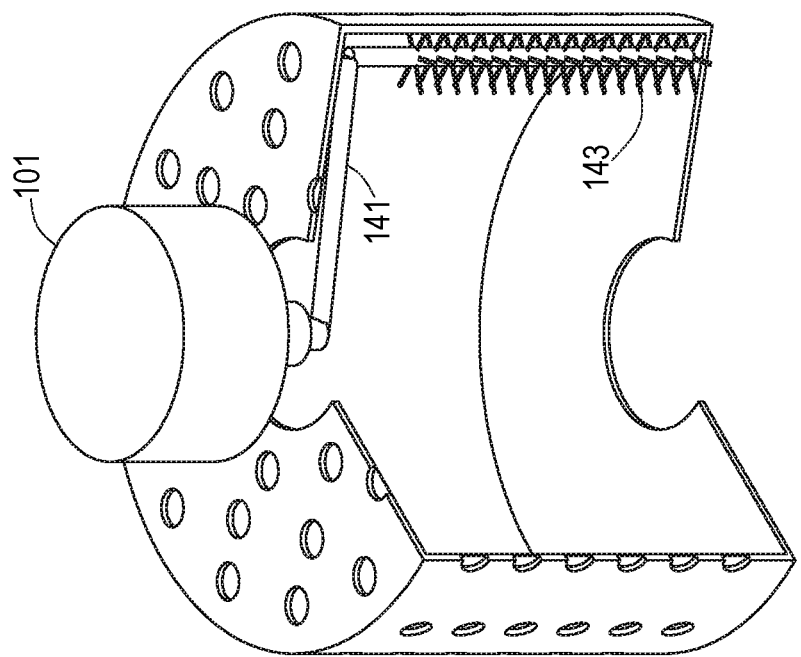
FIG. 13 illustrates a filtering unit that includes a cleaning element, and a movement element according to an embodiment of the invention.
Figure 12:
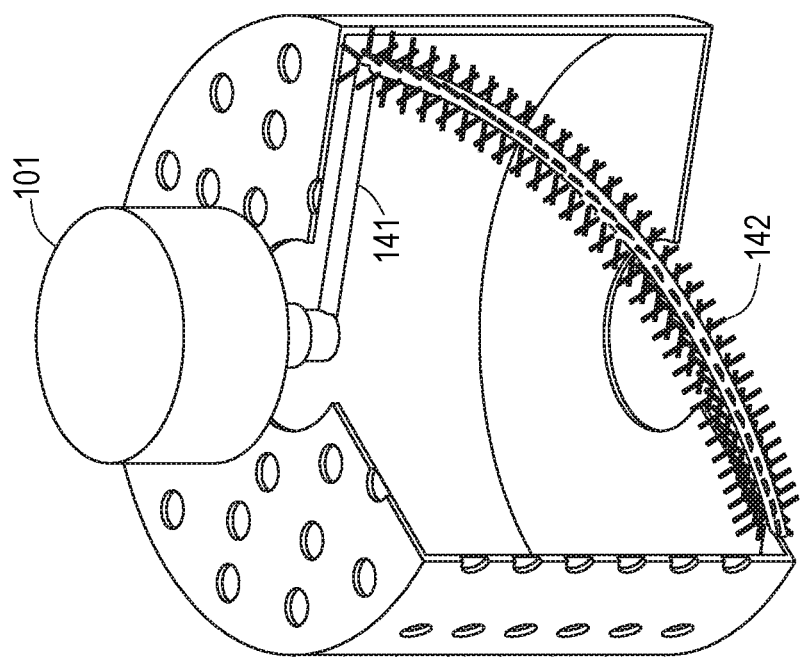
FIG. 12 illustrates a filtering unit that includes a cleaning element, and a movement element according to an embodiment of the invention.
Figure 15:
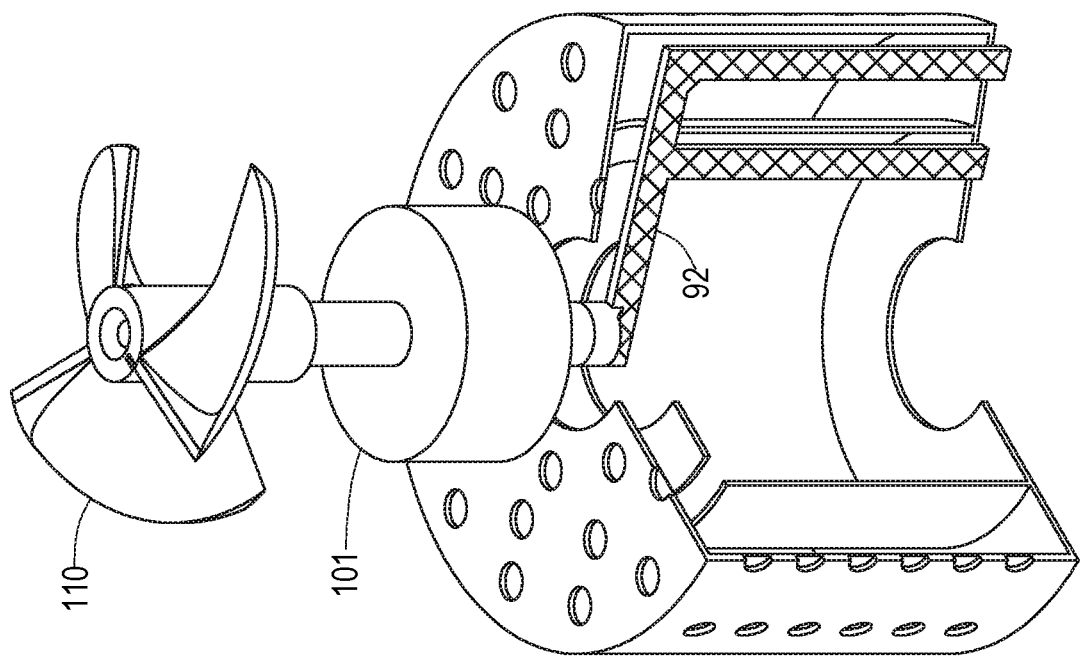
FIG. 15 illustrates a filtering unit that includes a cleaning element, an impeller and a movement element according to an embodiment of the invention.
Figure 14:
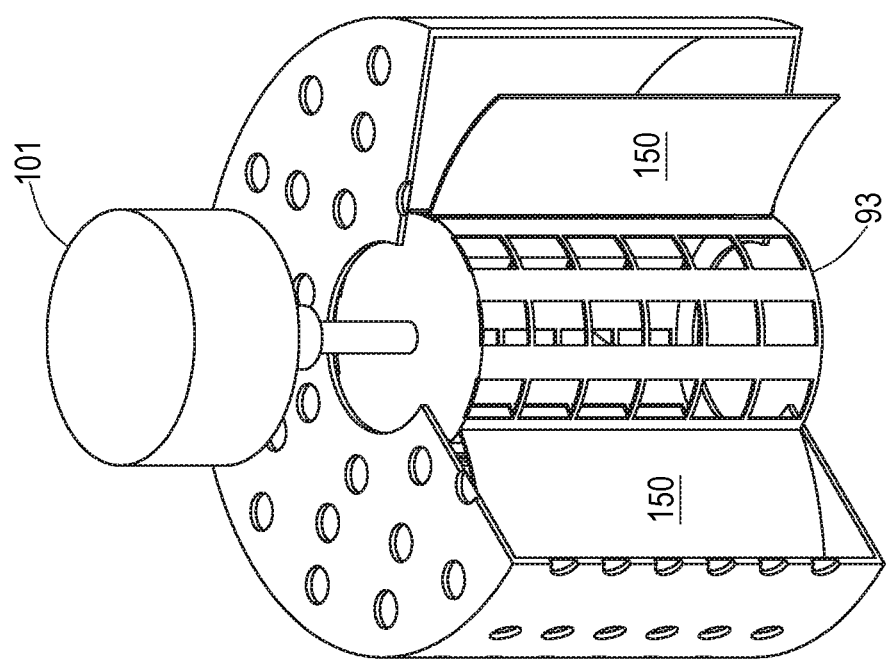
FIG. 14 illustrates a filtering unit that includes a cleaning element and a set of impeller blades, and a movement element according to an embodiment of the invention.

FIG. 9 illustrates a dedicated movement element that may spin a cleaning element around its own axis that may be employed in conjunction of a rotating or a static non-rotating filtering unit according to an embodiment of the invention;

FIG. 10 illustrates a movement element employing a gear transmission to rotate the filtering unit that may also spin a cleaning element around its own axis that may be employed in conjunction of a rotating filtering unit that may contain impeller blades 150 (not shown) according to an embodiment of the invention;

FIG. 14 illustrates a filtering unit that includes a set of internal impeller blades without use of any cleaning element(s); and a movement element to rotate the filtering unit according to an embodiment of the invention; and whereby the filtering unit or enclosure may be extracted for service from a bottom opening of the housing.

A Pool Cleaner that specifically comprises a static or rotating filtering unit or an enclosure (cartridge, screen(s)) with an integral, cleaning rotating or static blade or brush or scraper to wipe the filter screen simultaneously whilst the pool cleaner is busy with its automatic pool movement/scanning cycle and performing floor or wall cleaning tasks. The brushing or scraping activity provides clean filter mesh areas and increased usage of a given filter volume. Wiper blades or filter system are rotatably driven so as to have an edge of the wiper blade rotatably moving on the screen for moving dirt, debris solids or cake collected on the screen(s).

Cleaning elements such as wiper or brushing blades may be attached or form part of a device such as an arm or a cylindrical structure that is static in relation to the pool cleaner body and the wiping is performed on the revolving or rotating filter surface. On the other hand, the said cleaning element may be connected to a motor shaft (geared drive motor) that will rotate around the inside and cover the internal walls of the filter screen. In addition, the device may be connected to another gear arrangement that will rotatably revolve the cleaning element around itself while covering the internal walls of the filter screen.

a. The cleaning element may be of various types and shapes:
b. It may consist of a straight arm comprising various type brushes and scrappers with bristles or hairs or without. The cleaning element may be of an inverted L-shape when a said drive motor is positioned above or below along a central imaginary longitudinal axis of the filter mechanism thereby bringing the brushes nearer to the screen surfaces.
c. The cleaning element may have a step or a cam type shape with extension arms comprising pivoting brushes and/or scrapers assembled in various mixes of configurations so that when the entire cleaning element pivots it brushes against the screen surface and interacts with it by intermittently introducing different sections of the rotating arm (it may intermittently also employ different types of brush tips or bristles or wipers) and thereby adding swirl effects into the water nearby the filter screen surface.
d. The cleaning element may comprise of a device that has a revolving or non-revolving spiral shape (straight line, inverted L-shape, diagonally positioned across the filter. The cleaning element may comprise of a cylindrical structure (a hollow structure that can be removably be fitted onto the spindle (denotes 93 in FIGS. 2B and 14, 160 in FIG. 16 or 203 in FIG. 18) within the filter screen structure so that the cleaning element comprises any of the brush/scrapers, with bristles or without attached onto the external periphery of the cylindrical structure. Such as a perpendicular spiral shaped hollow brush device that rotates inside a static filter structure.

Figure 16:
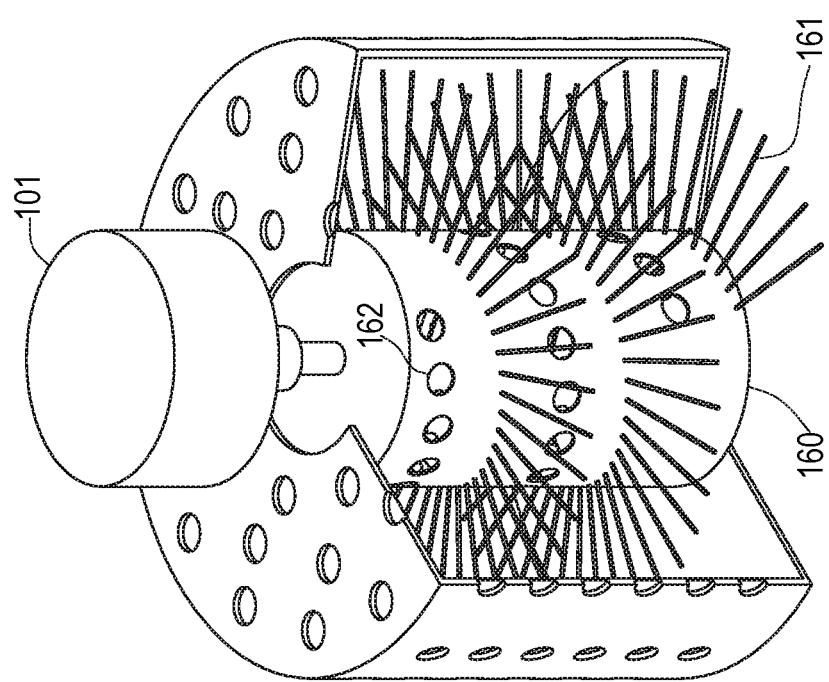
FIG. 16 illustrates a filtering unit that includes a cleaning element, and a movement element according to an embodiment of the invention.

The internal core or perforated cylinder denoted 93 in FIG. 2B and in FIG. 14, 160 in FIG. 16 or 203 in FIG. 18 may, in addition or alternatively, comprise of impeller blades that are located inside the internal core (not shown) in order to provide water suction force.

FIGS. 4-5 and 7-15 illustrate self-cleaning filter embodiments. It will be noted that all filter embodiments may be revolving or of the commonly used static type.

Figure 4:
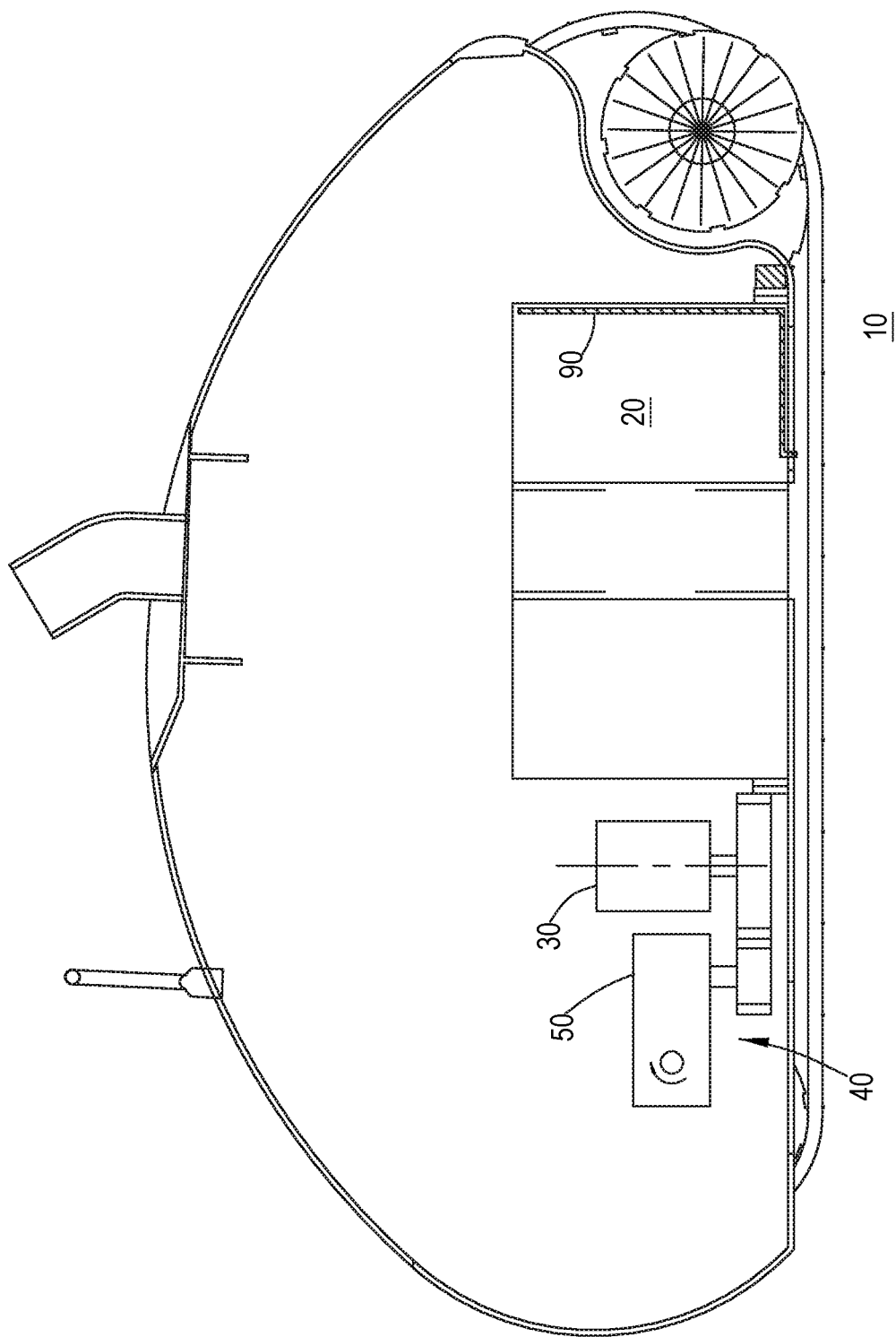
FIG. 4 is a cross sectional view of a pool cleaner according to an embodiment of the invention.
Figure 5:
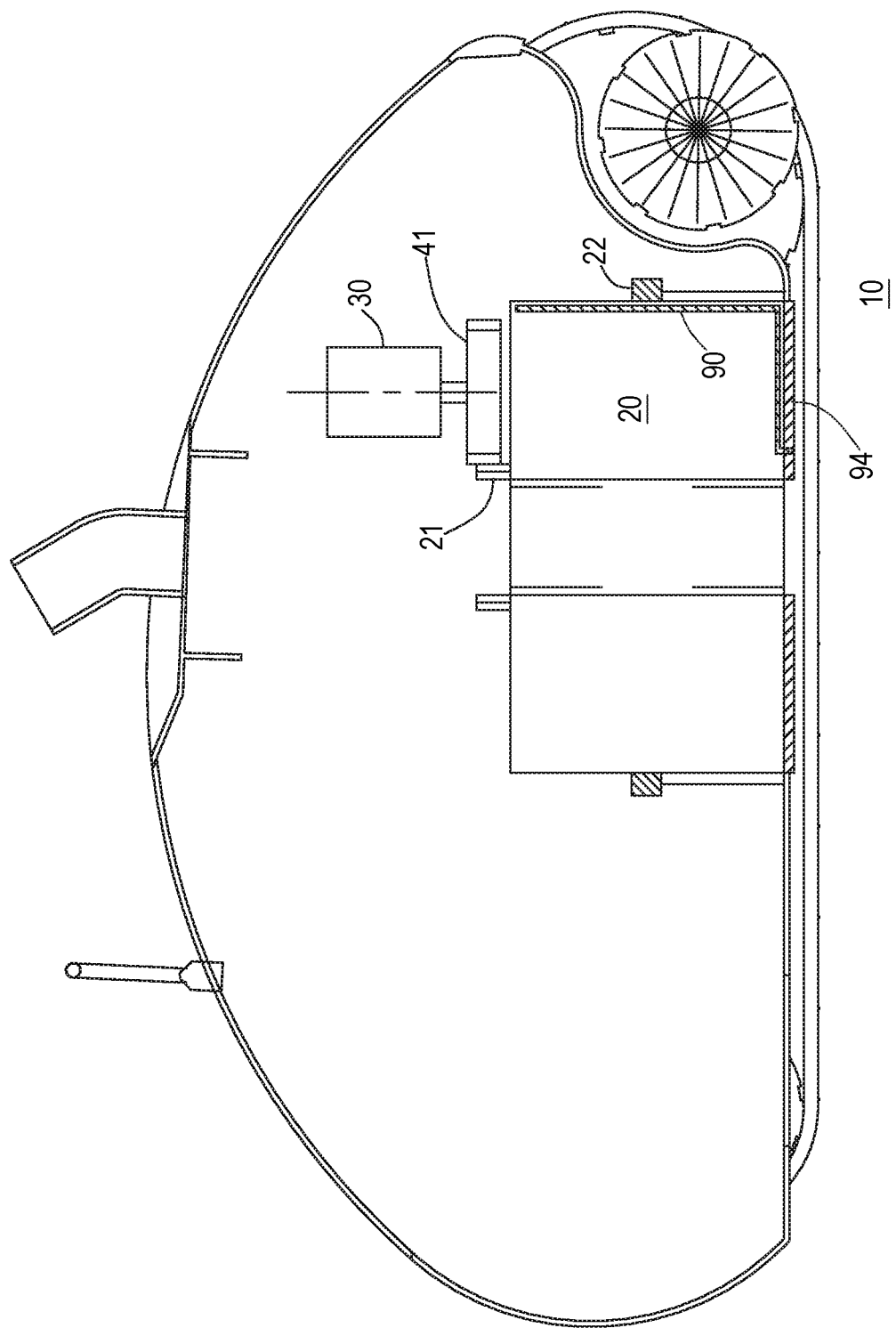
FIG. 5 is a cross sectional view of a pool cleaner according to an embodiment of the invention.
Figure 6:
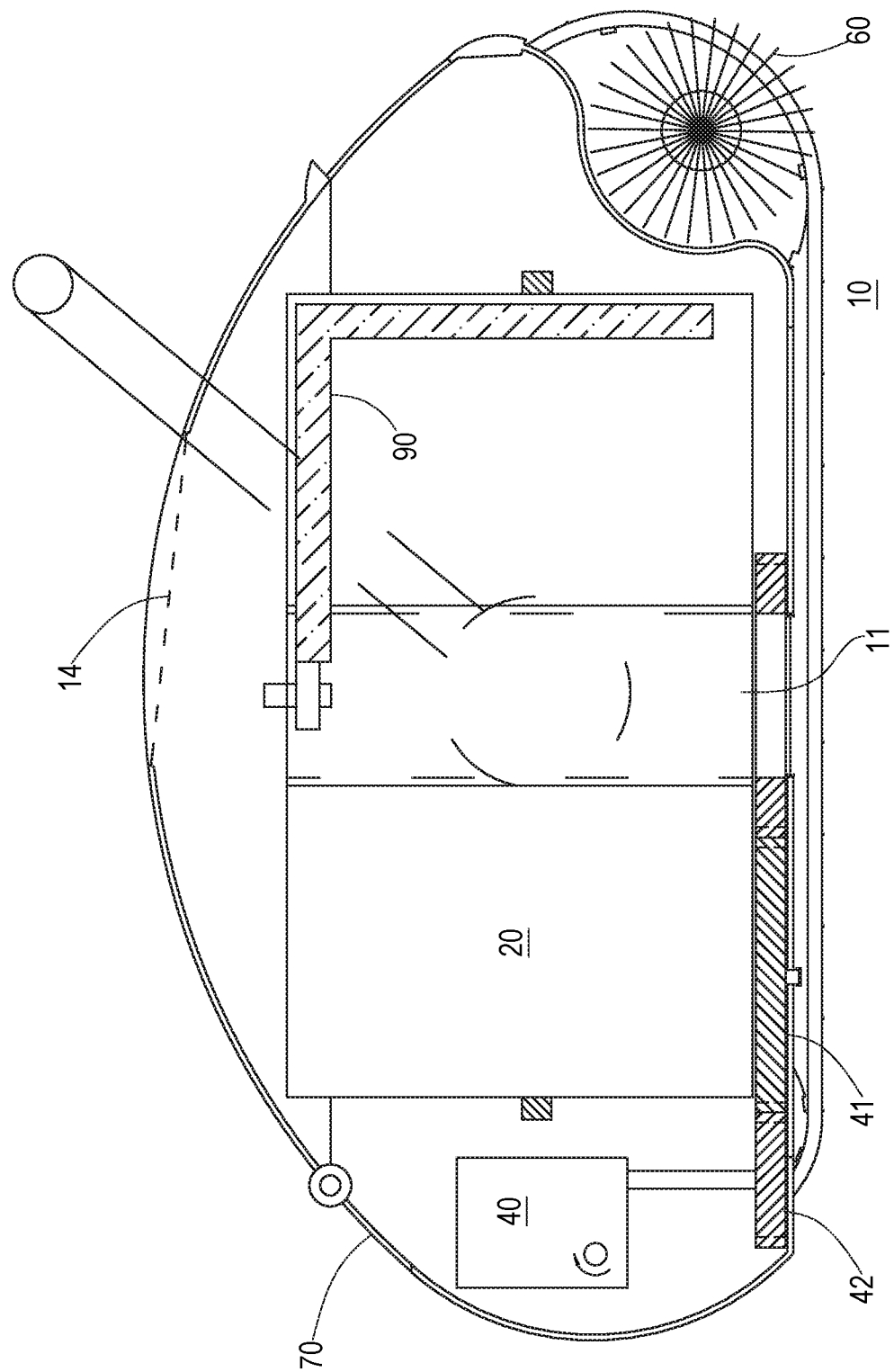
FIG. 6 is a cross sectional view of a pool cleaner according to an embodiment of the invention.

FIG. 4-5 illustrates an arm 90 that is fixed to the bottom of the housing and interfaces with the inner surface of the filtering unit 20 whereas the arm 90 is fixed regardless a rotation of the filtering unit 20.

FIG. 16 illustrates an internal filter cleaner that has a cleaning element core such as porous cylinder 160 that is connected to interfacing elements such as helical or spherical brush 161 with spaced apart bristles that extends from the porous cylinder 160. The porous cylinder includes multiple apertures 162. The cleaning element core may be located at the center (or about the center) of the cleaning element and may be shaped as a porous cylinder or may have any other shape. The porous cylinder is rotated by a rotating mechanism that includes engine 101 and an axle. The internal filter cleaner helical brush has the helix edges continually contact the filter walls thereby creating both a brushing and a water turbulence effect which clears the pores of the filter. Thereby improving even further the performance of the self-cleaning function. The usage of such pore structure configuration as in 162 may be most suitable for example, in indoor swimming pools that do not accumulate large debris such as leaves or twigs but do need to remove accumulated calc off the filter surface.

Figure 7:
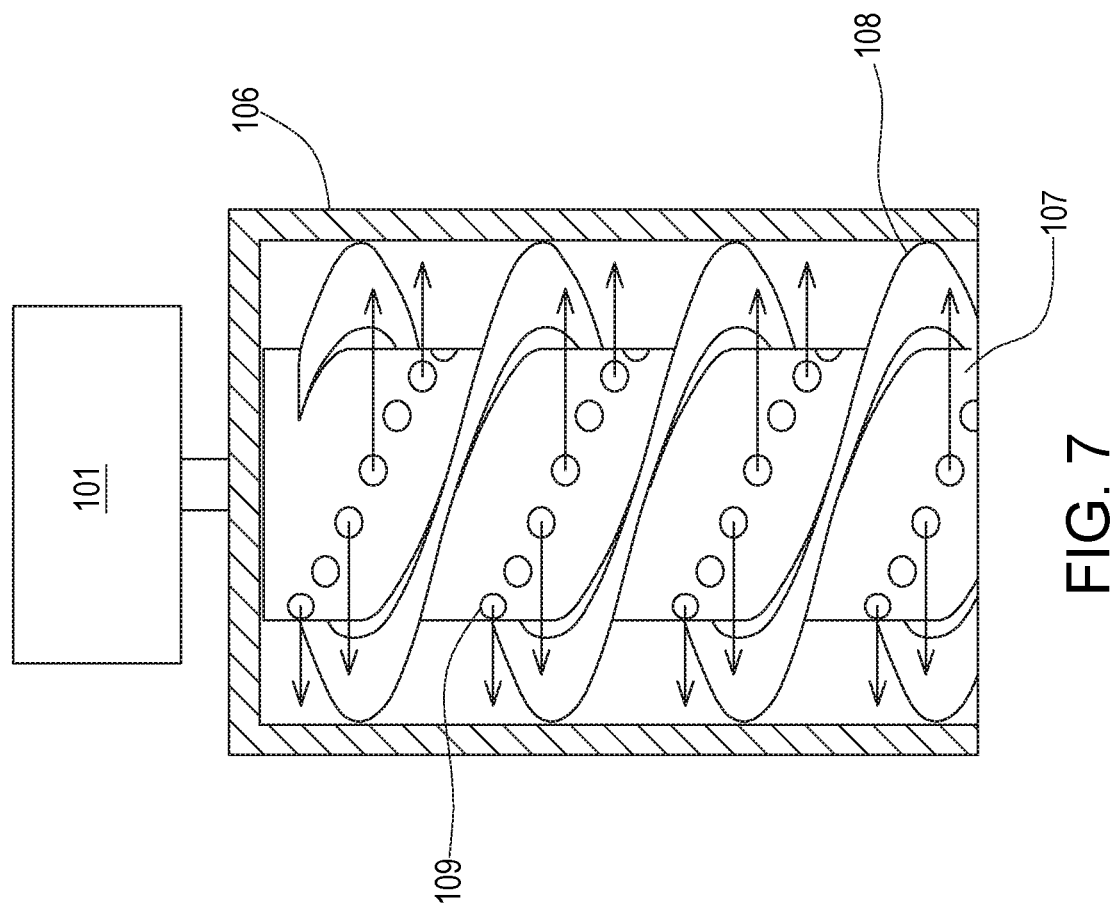
FIG. 7 is a cross sectional view of a filtering unit that includes a cleaning element and movement element according to an embodiment of the invention.

In FIG. 7 the spaced apart bristles are replaced by a continuous helix 108 that interfaces with an internal section of filtering element 106. The continuous spiral 108 extends from porous cylinder 107 that includes multiple apertures 109. Helix 108 may include spaced apart segments. Here too, such pore structure configuration as in 109 may be most suitable in indoor swimming pools without large debris but with a need to scrape off accumulated fine particles off the filter surface(s). Engine 101 may include an external impeller (not shown). Filtering element 106 extraction for servicing and reloading may be performed from the bottom opening of the housing 70.

Figure 17:
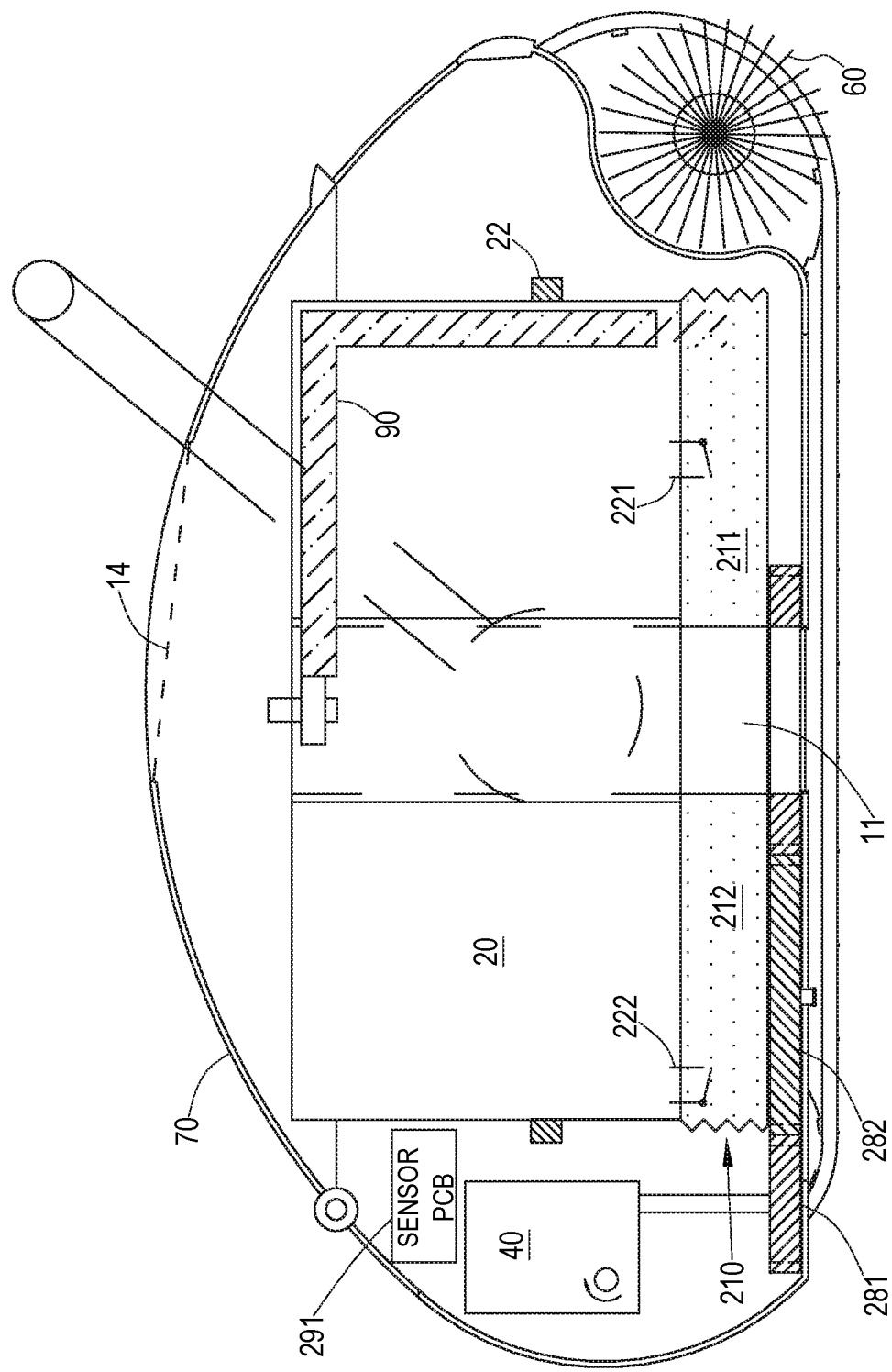
FIG. 17 is a cross sectional view of a pool cleaner according to an embodiment of the invention.

FIG. 17 illustrates pool cleaner 10 according to an embodiment of the invention.

Pool cleaner 10 includes a drive mechanism (including motor 30, mesh 42 and transmission mechanism element 50 and a PCB/sensor control device 291) for moving the pool cleaner, a housing 70 that has a first fluid opening 11 and a second fluid opening 14; a filtering unit 20 (illustrated as including cleaning element 90 and filter enclosure 105, a filtering element) and debris trap 210.

Debris trap 210 and filtering unit 20 are fluidly coupled to each other by a uni-directional flow element such as uni-directional valves 221 and 222 that facilitate a flow of debris from the filtering unit 20 to the debris trap 210 and prevents a flow of debris from the debris trap 210 to the filtering element 20.

In FIG. 17 uni-directional valve 222 is coupled to a left part 212 of debris trap 210 and uni-directional valve 221 is coupled to a right part 211 of debris trap 210.

The uni-directional valves may be located closer to the sidewalls of the filtering unit—as the debris (due to the rotation of the filtering unit) may propagate towards the sidewalls of the filtering unit.

The debris trap 210, seen in FIG. 17 substantially at its optimal radius, may rotate with the filtering unit or enclosure (by mechanical coupling with the filtering unit), may rotate independently (by a mechanical coupling with motor 30 or with another motor) or may be static during the rotation of the filtering unit.

The debris trap may include elastic (or otherwise expandable) or non-elastic walls. It may be a bag that turns with the rotation of the filter (the entire filtering unit is removable for service). When the fine particles filter element becomes clogged (picked up by sensors) the self-cleaning arm may be activated if in an intermittent/non continuous mode. In such an event, the flow of debris may be simultaneously activated so that the cleaner/filtering unit will not 'smoke' due to unsettling of the dirt that is stuck onto the filter. The 'smoke' is a phenomenon that is prevented when a fine filter has dirt particles on it and these particles cumulatively assist with the fine filtering by reducing the nominal micron pore size. Filter may be a metallic, carbon based, paper or polymer mesh. When the pores start to eventually clog and the self-cleaning mechanism is activated without the backwash flowing of the debris then a white or grey milky dust cloud may exit the pool cleaner. The activation of a flow of debris will draw the debris and keep it inside the trap. The pool cleaner may be stationary in order to achieve an effective backwash. The rotation speed of the filtering unit may be reduced whilst the speed of an independently rotating and/or spinning cleaning element may be increased in order to achieve best backwash in the shortest time.

The debris trap may fill in with water and debris by reversing the flow of water so that it enters the pool cleaner from the outlet 14, passes through the filter screen and exits via the inlet 11 trapping all debris inside the trap. The trap may expand whilst accumulating additional dirt. Expansion may be in an outward direction depending on the limiting walls that restrict or 'sandwich' debris trap 210. As soon as the backwash procedure ends and normal cleaning cycle resumes valves 222 and 221 close and trapped water inside the trap will slowly seep out reducing the size and volume of the expanded trap.

FIG. 17 also illustrates rotating mechanism (motor 30, first gear 41 and filtering unit gear 21) that is configured to rotate the filtering unit 20 or the enclosure 105, thereby causing the cleaning element to clean an inner section of the filtering element.

FIG. 17 further illustrates a sensor and control box PCB for sensing when the filtering unit is clogged. The sensor may be a pressure sensor for sensing the pressure of fluid within the pool cleaner, may be an optical sensor, may be an ultrasound sensor, a motor or rpm activity sensor and the like. Any pool cleaner illustrated in any of the figures may include such a sensor.

The readings of the sensor may be used to trigger a self-cleaning operation.

FIG. 18 illustrates a filtering unit 222 according to an embodiment of the invention.

Filtering unit 222 includes a filter enclosure 105 that has a handle 275 for manually removing the filtering unit from the top, a fine filtering element 232, a coarse filtering element 231, a second cleaning element 252 for cleaning the coarse filtering element 232, a first cleaning element 251 for cleaning the fine cleaning element 231. In FIG. 18 the first and second cleaning elements are inverted L shaped arms. They can be replaced by any other cleaning elements. First cleaning element 251 is located within coarse filtering element 231 and second cleaning element 252 is positioned within the fine filtering element 232. FIG. 18 also shows a motor 292 that is mechanically coupled via an additional transmission mechanism to the second cleaning element 252 and may lengthen or shorten the length of the upper part of second cleaning element 252 (which may be a telescopic arm or any other variable length arrangement). The additional transmission mechanism may include a pinion gear and a rack.

The filtering unit or the enclosure 105 is rotated by gear 281 that meshes with additional gear 282 positioned below the filter enclosure 105.

Impeller blades 202 that are connected to the filtering unit are rotated with the rotation of the filtering unit or enclosure 105. An apertured cylinder or core 203 (with large apertures 204) is positioned at the center of filter enclosure 105. The apertured cylinder or core 203 may be static, rotate with the rotation of the filtering unit or enclosure 105 and/or rotate independently from the rotation of the filtering unit or filter enclosure 105. Axle 276 is connected to the top of apertured cylinder 203 and may be static or rotate (for example by movement element 292 of FIG. 18 that also rotates impeller 110 that is external to the filtering unit).

The resulting outcome of any of the above configurations is such that the usability time of the filter is dramatically prolonged to such an extent that an automatic or manual removal of the filtering system and replacement function of the pool cleaner may not be as frequently or successively necessitated as with the present art concerning self-contained filter mechanisms in pool cleaning apparatuses.

Such self-cleaning systems provide a solution against filter mesh clogging and—in any embodiment—there will be an extension of the mean time between servicing of the pool cleaner to evacuate, remove, collected dirt and debris, to clean the filter and to provide a clean and effective filter system within the pool cleaner for extended periods of time.

FIG. 19 illustrates a filtering unit 223 according to an embodiment of the invention. It comprises a double movement element comprising a set of internal gear activated impeller blades and an additional boosting impeller 110 located externally; it is also comprising double cleaning elements, each having different arms such as for example a haired brush followed by a scraper, whereby the cleaning elements may be controlled by a control box within 101 to actuate, for example a rotating gear, that may also form part of 101 and it's control box.

Figure 20:
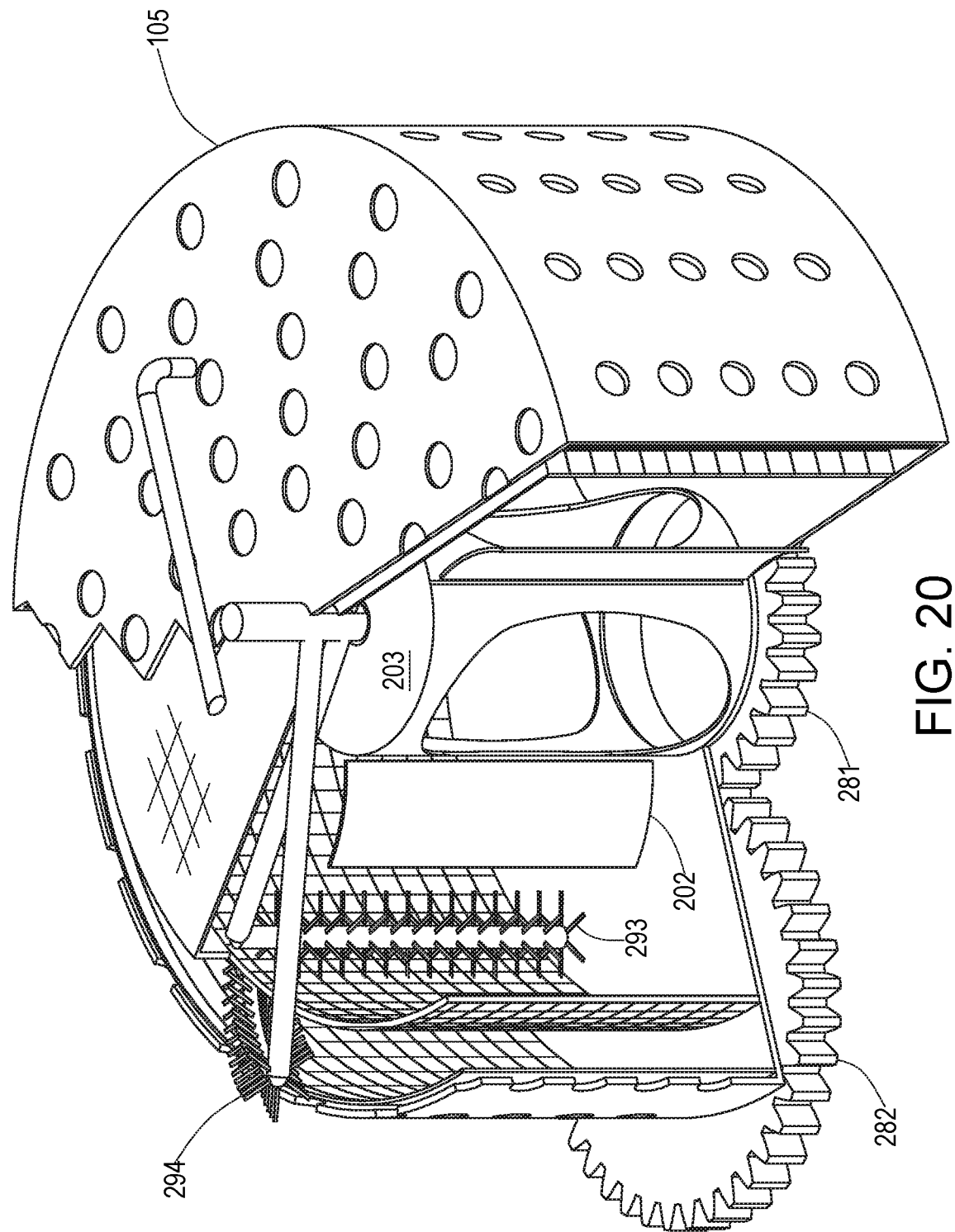
FIG. 20 illustrates a filtering unit that includes cleaning elements and a set of impeller blades according to an embodiment of the invention.

In FIG. 20 Filtering unit 223 differs from filtering unit 222 by including first and second brushes 293 and 294 instead of inverted L-shaped cleaning elements 251 and 252.

First and second brushes 293 and 294 may be manually replaced by an end user with any other cleaning elements. First brush 293 is located within coarse filtering element 231 and may clean the inner sidewall of coarse filtering element. Second brush 294 is positioned within the fine filtering element 232 and may clean the inner sidewall of fine filtering element. Second brush 294 may also clean the external sidewall of the coarse filtering element.

In FIG. 20 and/or see below FIG. 21, an end user may manually remove at least one cleaning element or a section thereof by unscrewing a securing screw(s) of an arm's section, and this may be done for any reason or for replacement of a type of cleaning element type or configuration or when replacement is required due to fair wear and tear of a cleaning element brush, rod, scrapper or even an arm.

It is noted that having a coarse filtering element and a fine filtering element is merely a non-limiting example of two filtering elements. Thus, any filtering unit that includes a coarse and a fine filtering elements may include any two filtering elements. Including filtering elements of the same filtering level.

Figure 21:
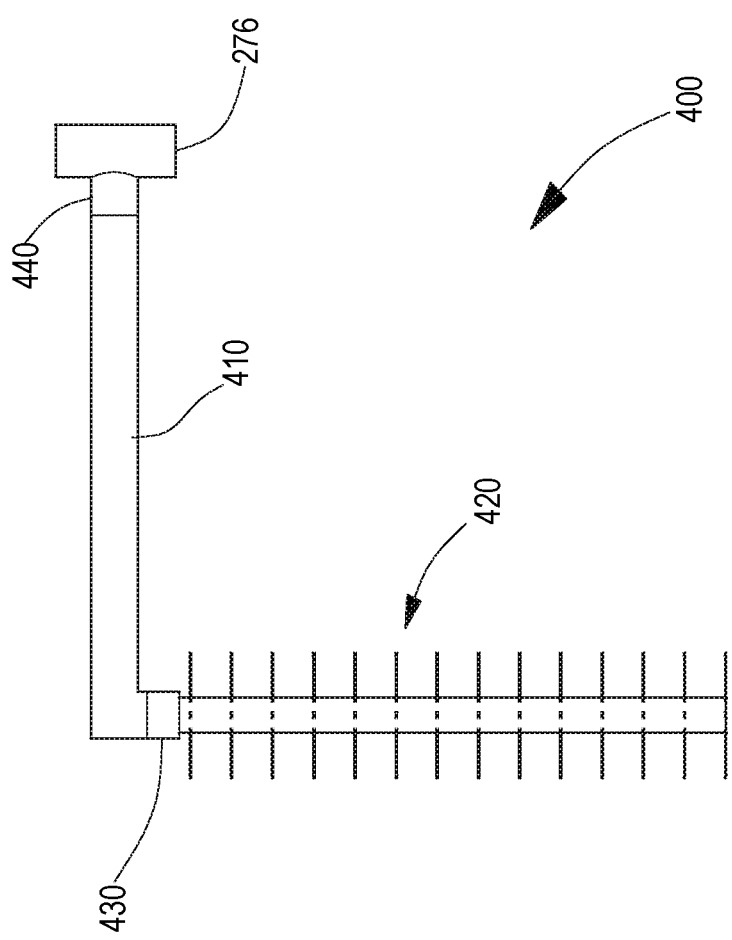
FIG. 21 illustrates cleaning element according to an embodiment of the invention.

FIG. 21 illustrates a pool cleaner according to an embodiment of the invention.

The pool cleaner may not include a cleaning element but imposes a rotation of the filtering element to clean the filtering element. The filtering element is shaped as a cone, or an inverter cone (but may have other shapes) and the rotating mechanism (such as motor and transmission mechanism) is configured to introduce a relative rotation between the filtering element and the housing thereby causing debris to be detaches from the filtering element.

The filtering element may have a radial symmetry and has a cross section that is not parallel to an axis of rotation of the relative rotation.

Yet according to another embodiment of the invention the pool cleaner of FIG. 21 may have a cleaning element, that is shaped to fit the shape of the filtering element.

It is noted that although FIGS. 1-20 illustrates a cylindrical filtering element—that the filtering element may have any shape, including, but not limited to a conical shape, a staggered shape, a polygon shape, and the like.

According to an embodiment of the invention any cleaning element may be removed and/or replaced by a user. Thus, each cleaning element may be detachably connected to other parts of the pool cleaning robot. Additionally or alternatively, the cleaning element may include multiple detachable parts.

FIG. 21 illustrates a cleaning element 400 according to an embodiment of the invention. Cleaning element 400 that include a supporting element such as horizontal bar 410 that is detachably connected to axel 276 (via interfacing element 440) and to an interfacing element—such as brush 420 (via interfacing element 430). The brush 420 can be detached from bar 410 and replaced by another brush—or by another type of interfacing element. The horizontal bar 410 may be detached from axel 276 and be replaced or removed.

Figure 22:
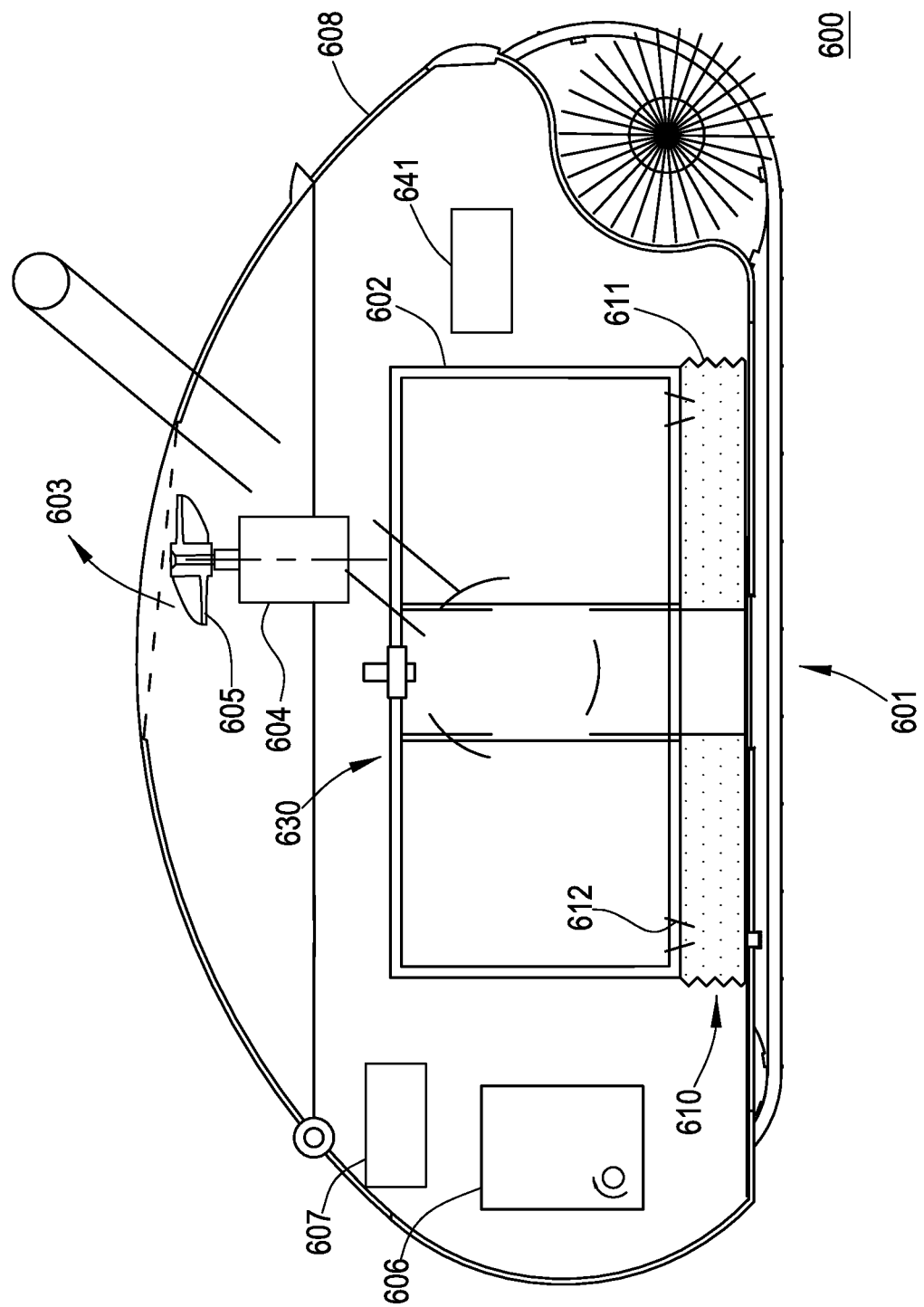
FIG. 22 is a cross section of a pool cleaner according to an embodiment of the invention.
Figure 23:
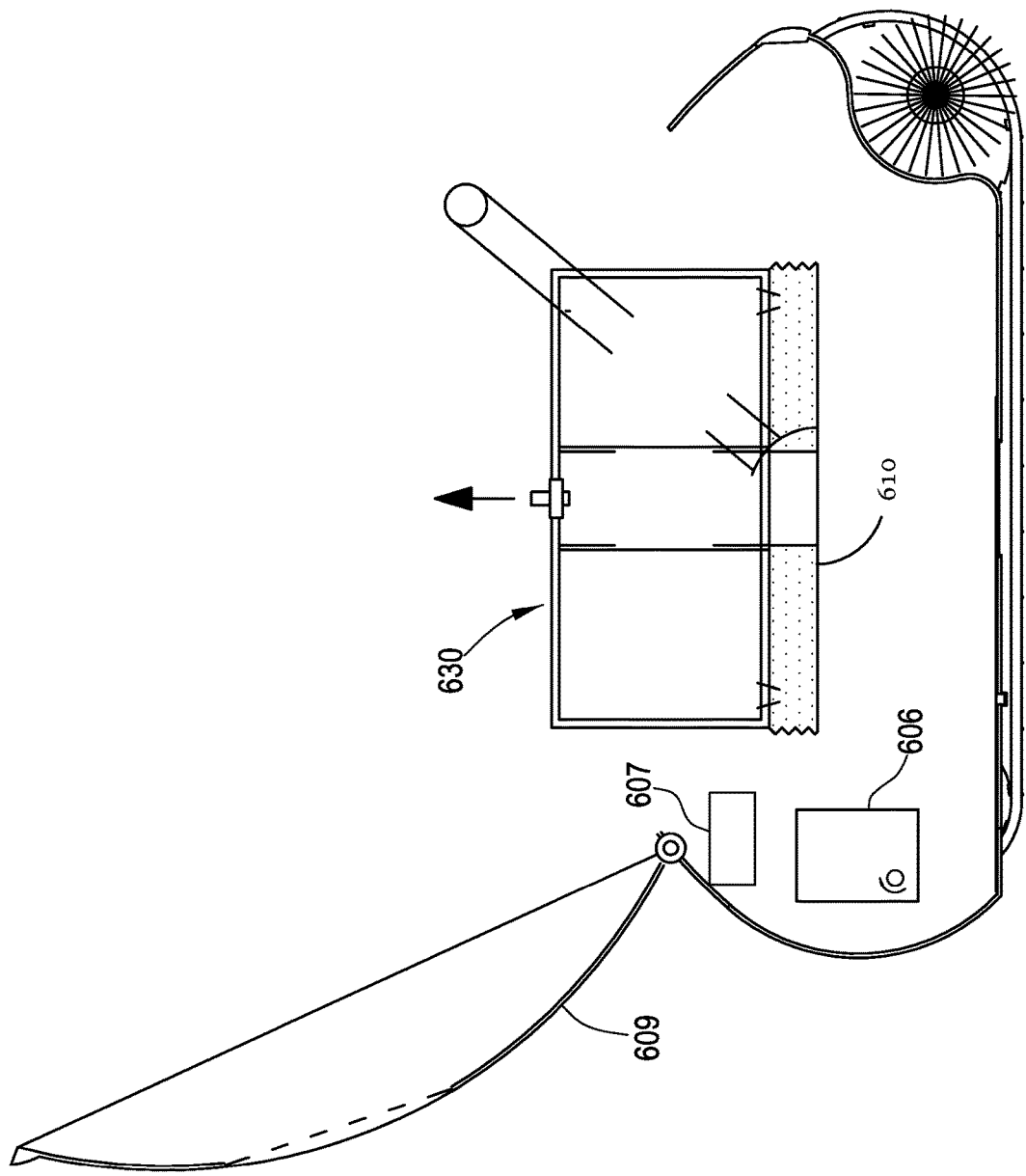
FIG. 23 is a cross section of a pool cleaner according to an embodiment of the invention.

FIGS. 22 and 23 illustrate a pool cleaner 600 that may include a drive mechanism (drive motor 606 is a part of the driving mechanism) for moving the pool cleaner; pump motor (604), impeller (605), controller 607, housing (608) that has first fluid opening (601) and second fluid opening (603); filtering unit (630 having filtering element 602); debris trap (610, has sidewalls 611).

The debris trap and the filtering unit are fluidly coupled to each other by a flow element (612) that facilitates a flow of debris from the filtering element to the debris trap and prevents a flow of debris from the debris trap to the filtering element during a purging backwash or a continuous backwash operation.

The pool cleaner may include a sensor (641) for sensing when the filtering element is clogged to a predefined level and to trigger a mode of backwash by transferring a flow of debris from the filtering element to the debris trap. The sensor may sense the pressure within the pool cleaner, may monitor the pump motor and/or impeller as clogged filters may change the flow within the pool cleaner, may be an optical sensor, a pressure sensor and the like.

The flow element may be a regular bi-directional conduit or a uni-directional valve.

The debris trap may have elastic sidewalls (611) that are configured to expand when the pool cleaner is in a backwash mode of flowing dirt into the debris trap. The sidewalls may be non-elastic or only partially elastic.

The sidewalls may contain concertina type bellows that may also include springs to facilitate the expansion and contraction process. Thus—sidewall 611 may be shaped to have a cross section of a spring—and the spring may be pushed away from the center of the debris trap during the backwash process and may return towards the center when the backwash process ends.

The debris trap may be configured to expand when receiving the debris and to contract when not receiving the debris.

Debris trap 610 and filtering unit 630 are fluidly coupled to each other by a flow element that facilitate a flow of debris from the filtering unit 630 to the debris trap 210 and prevents a flow of debris from the debris trap 210 to the filtering element 602. It is noted that some debris may be allowed to flow backwards and that the prevention does not need to be 100%.

The debris trap may include elastic (or otherwise expandable) or non-elastic walls. The debris trap (especially its sidewalls) may extend outwards during the backwash process thereby extending the volume of the debris trap by a predefined amount (depending on the elasticity of the sidewalls and/or obstacles that prevent their expansion). The predefined amount may range, for example, between 1 and 200%.

The debris trap may include porous or non-porous holes—for example porous holes that may have a diameter between 1 and 100 microns—especially 50 microns that enable the trapping of fine particles that are one of the main reasons that pool cleaners filters become clogged.

When the pores of the filtering element start to eventually clog with fine dirt particles, the pool cleaner may be brought to a stationary position so that the purging backwash flowing of the said particles may start in order to achieve an effective backwash in the shortest time. The activation of a backflow of debris will draw the fine particles from the filtering unit into the debris trap and keep it inside the trap. Alternatively, the backwash may occur when the pool cleaner is still moving. When the pool cleaner has more than a single pump motor and/or impeller then one of the pumps and/or impeller may perform backwash while the other may still assist in the filtering. When the pool cleaner has more than a single filter (preferably having a separate filtering path) then one filter may be backwashed while the other may filter. When having multiple filters the multiple filters may be parallel or non-parallel to each other within the housing.

The debris trap may fill in with water and the fine particles by reversing the flow of water so that it enters the pool cleaner from 603, passes through the filter screen and exits via the 601 trapping all debris inside the trap.

The backwash may be performed in an intermittent/non-continuous purging mode or in a continuous flow mode. For example—during a backwash period (period of time allocated for backwashing) the backwash may be executed in a continuous manner (backwashing during the entire backwash period) or in a non-continuous manner (backwashing in pulses).

In another embodiment, the debris trap may fill in with water and fine debris particles without actively reversing the impeller rotation for a purging backwash flow of water but by means of the gravitational force that may be applied onto the debris particles inside filter 630 while the pool cleaner is stationary and not applying any pumping forces at all. Namely, following the pumping turbulences inside the filter while actively pumping or reverse purging, the dust particles may sink freely to the bottom of the filtering unit and enter into the debris trap 610 or 210 through the low element 612 by gravitation. To achieve this effect, the currently depicted flat base of filtering unit 630 may be inclined (not shown) in conjunction of flow element (612) so that a triangular or conical base will expedite natural gravitational flow into a debris trap.

FIG. 23 illustrates a removal of the filtering unit and the debris trap from the pool cleaner—by opening a housing upper part 609 that is pivotally coupled to a housing lower part. The housing upper part may be totally removed or coupled to the lower part in a non-pivotal manner Alternatively, the filtering unit and/or the debris trap may be removed from another part of the housing—for example from the bottom.

FIG. 31 illustrates a pool cleaner 690 that may include a drive mechanism (drive motor 606 is a part of the driving mechanism) for moving the pool cleaner; pump motor (604), impeller (604), controller 607, housing (608) that has first fluid opening (601) and second fluid opening (603); filtering unit (630) that has filtering element 602). Pool cleaner 690 does not include a debris trap (depicted in FIG. 22).

Figure 24:
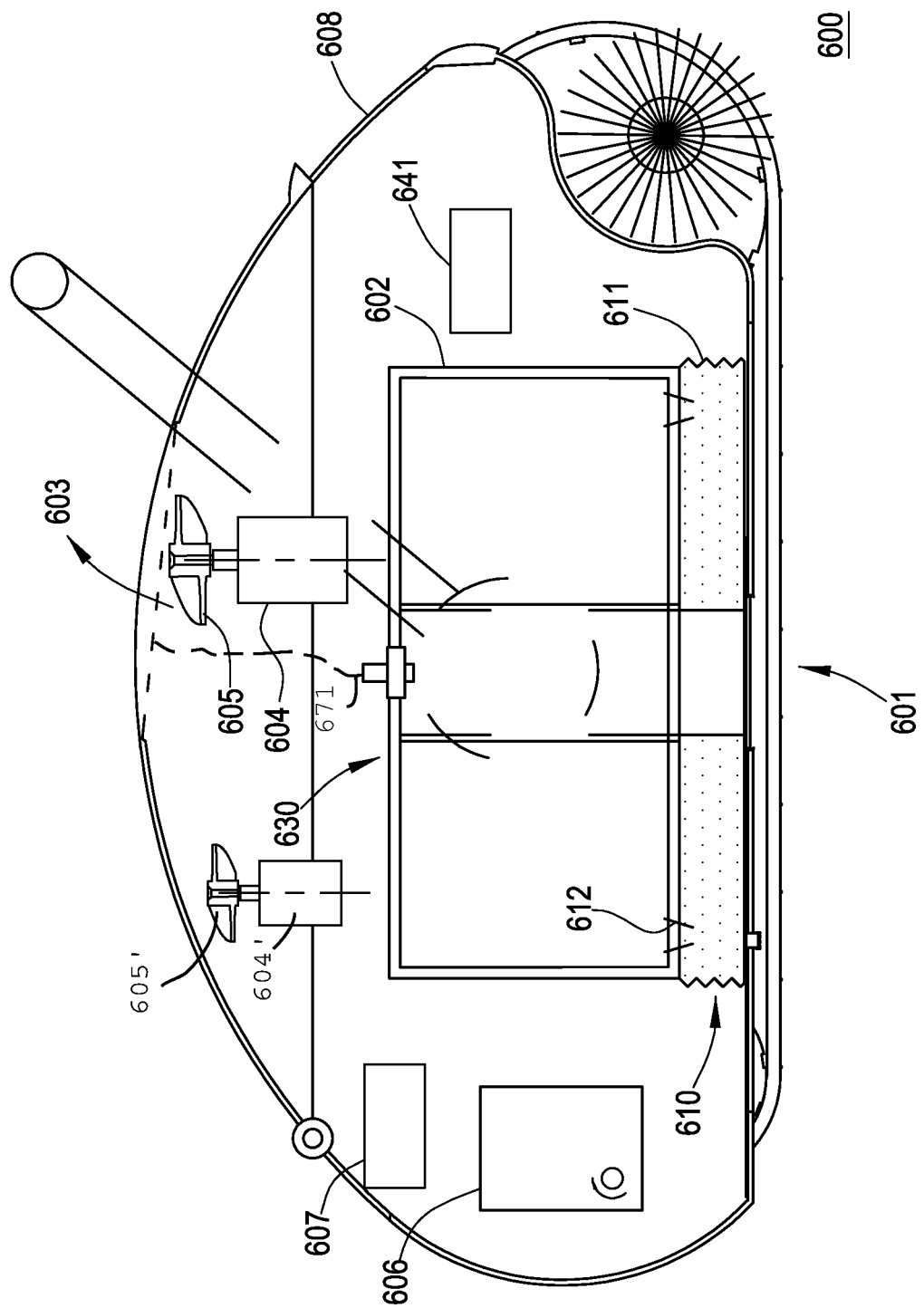
FIG. 24 is a cross section of a pool cleaner according to an embodiment of the invention.

FIG. 24 illustrates a pool cleaner 600 that includes multiple pump motors and multiple impellers—it includes an additional pump motor 604' and an additional impeller 605'.

Impeller 605 and additional impeller 605' may be rotated in synchronicity or in an asynchronous manner by pump motor 604 and additional pump motor 604' respectively.

One of these impellers may assist in the backwash process while another impeller of these impellers (605 or 605') may assist in a filtering process. In order to facilitate these seemingly contradicting roles (filtering versus backwashing) the pool cleaner may include a partitioning element that defines different fluid paths form these impellers. Dashed line 671 of FIG. 24 illustrates the partitioning element.

Figure 25:
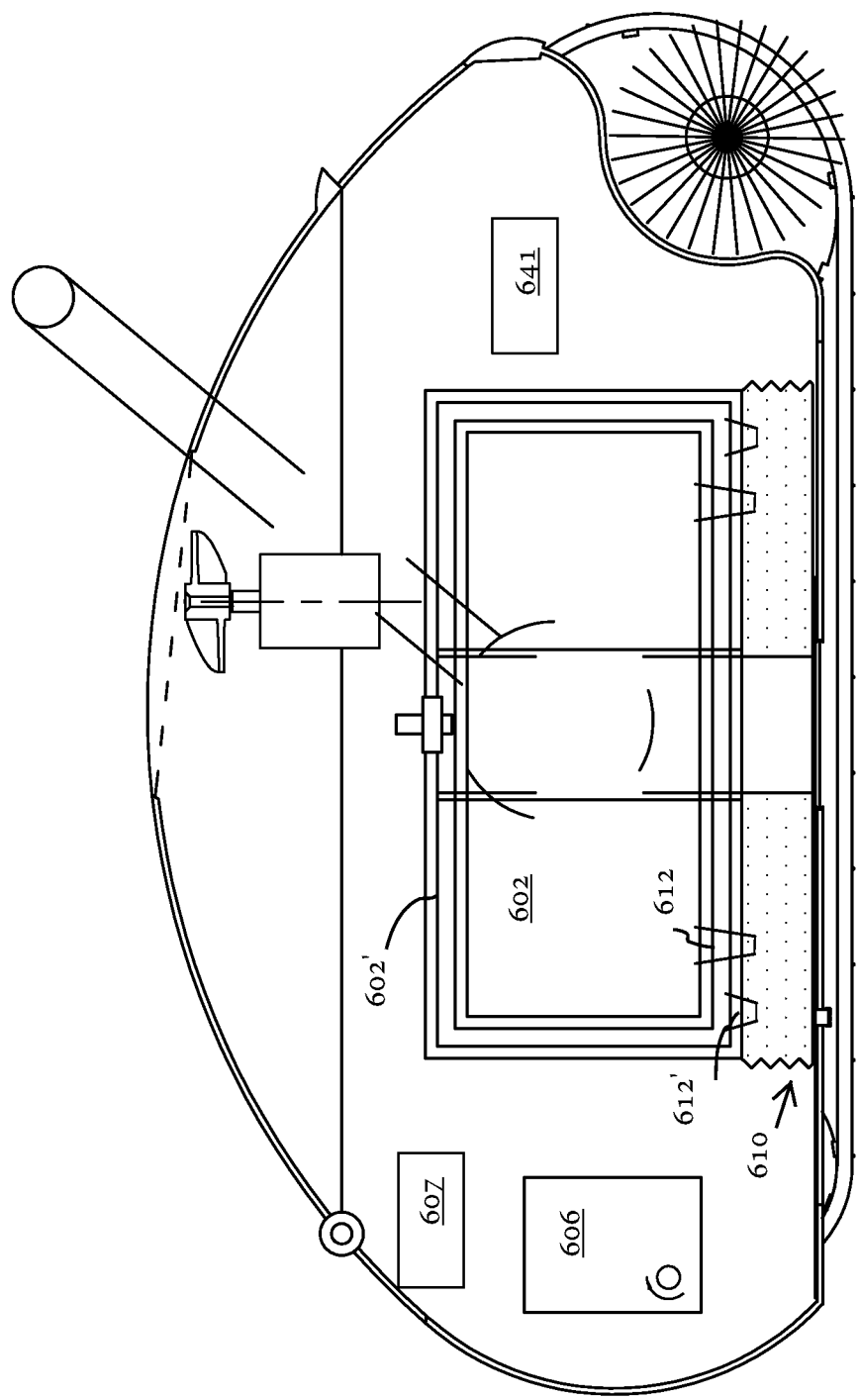
FIG. 25 is a cross section of a pool cleaner according to an embodiment of the invention.

FIG. 25 illustrates a pool cleaner that include two filtering elements 602 and 602'. Filtering element 602 is surrounded by additional filtering element 602'. Additional filtering element 602' may be a finer pores filter in relation to filtering element 602. Thus—at least some of the particles that may pass through filtering element 602 may be prevented from passing through additional filtering element 602'. It is noted that the filtering elements 602 and 602' may have different shapes and sizes. FIG. 25 illustrates that filtering element 602 and additional filtering elements are fluidly coupled to debris trap 610 via flow elements 612 and 612' that facilitate a flow of debris from the filtering elements to the debris trap and prevent a flow of debris from the debris trap to the filtering elements during a backwash process.

Flow elements 612 may also pass through additional filtering element 602' and may prevent debris from entering filtering element 602'.

According to an embodiment of the invention the pool fluid flow mechanism may include one or more fluid flow control elements that are positioned outside the filtering element and are configured to direct fluid towards the filtering unit sidewalls. These one or more flow control elements that participate in the backwash process may be also referred to a backwash module.

FIGS. 26-30 illustrates some examples of a backwash module of a pool cleaner.

The backwash operation (the backwash module) may be controlled by controller 607 of by another controller. The controller may or may not receive signals from sensor 641.

Figure 26:
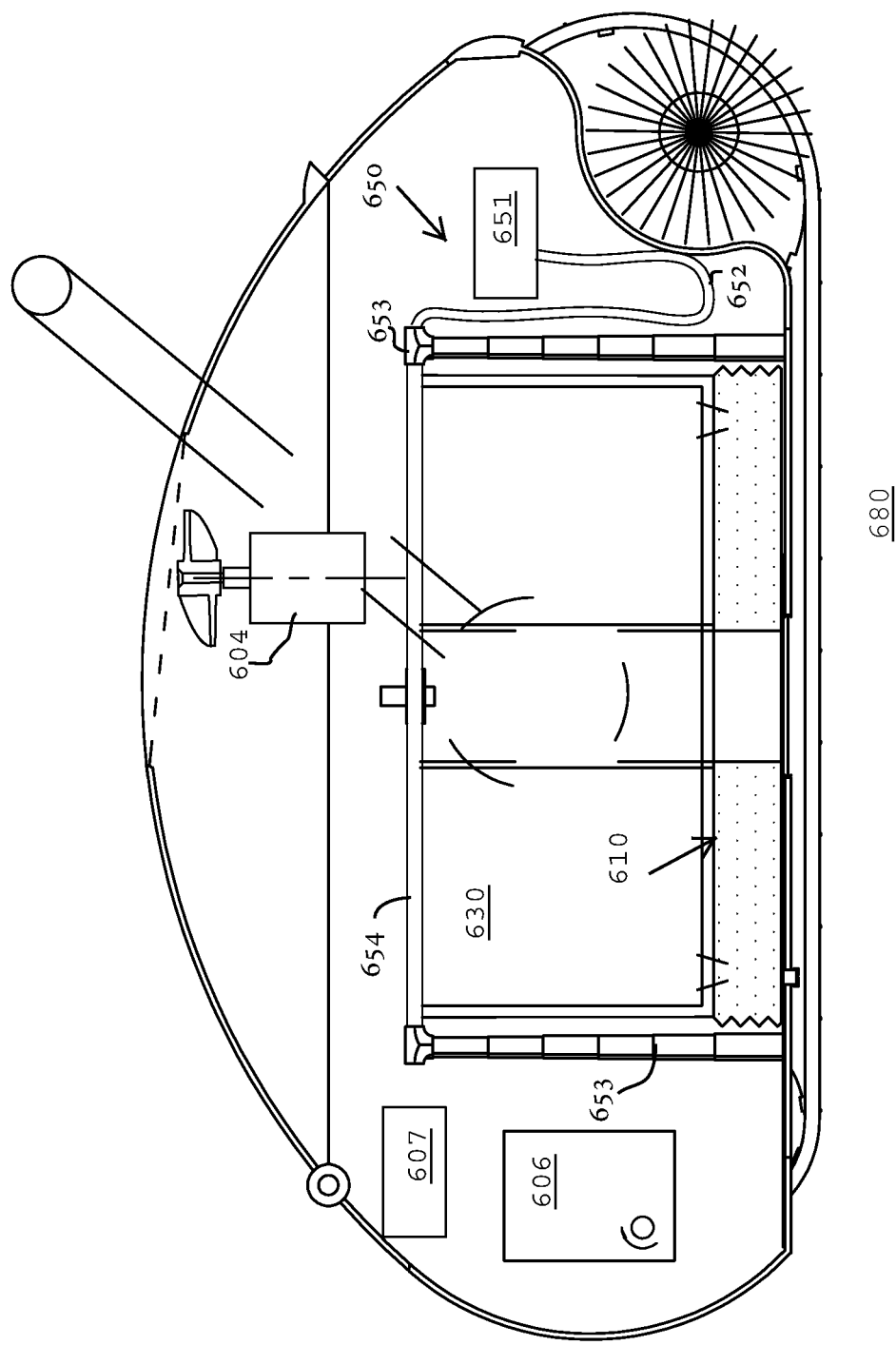
FIG. 26 is a cross section of a pool cleaner according to an embodiment of the invention.

FIG. 26 illustrates a pool cleaner 680 that differs from the pool cleaner 600 of FIG. 22 by including a backwash module 650 that includes:
 a. Fluid source 651 (such as but not limited to a pump).
 b. Fluid distribution elements such as hose 652 and pipes 654.
 c. Jets or sprinklers (denoted 655 in FIGS. 27-29) that are spread along the pipes 654, receive the fluid from pipes 654 and eject fluid jets towards the filtering unit.
 d. A scanning mechanism that may include telescopic rods 653 that are connected to lines 654, wherein the telescopic rods change their length thereby vertically scanning (elevating and lowering) pipes 654 so that the fluid jets cover different parts of the filtering unit.

The backwash module may or may not include an impeller and/or a pump motor that rotates the impeller. A pump motor is a motor that rotates the impeller.

The pump motor may reverse the rotation of the impeller to direct fluid towards the filtering unit at the end of the backwash process, during the entire backwash process, during one or more portions of the backwash process, and the like.

Thus, the backwash process may involve using any combination of the fluid source 651, the fluid distribution elements, the jets or sprinklers, the scanning mechanism and the impeller.

Alternatively, the impeller may be static during the backwash process or during one or more parts of the backwash process.

The impeller may be rotated at the same rotational direction as it is rotated during the filtering process during the entire backwash process or during one or more portions of the backwash process.

It should be noted that the rotational speed of the impeller may be the same during the filtering process and during the backwash process, may be the same during one or more portions of the filtering process and during one or more portions of the backwash process, or may differ between at least one portion of the backwash process and at least one or more portions of the filtering process.

The rotation of the impeller, the direction of rotation of the impeller and/or the rotational speed of the impeller may be a function of the state of the filtering unit and/or the state of the debris trap and/or the state of fluid within the filtering unit. For example—less transparent fluid within the filtering unit may require to rotate the impeller at a higher speed in order to push the fluid towards the debris trap. When the fluid is more transparent the impeller may be static. The transparency of the fluid within the filtering unit may be sensed by an image sensor that may image the interior of the filtering unit, by a sensor that may sense the liquid outside the filtering unit, by sensing the pressure of fluid within the pool cleaner (lower pressure may indicate that the filtering unit is less clogged and thus may include a more transparent fluid) and the like.

The telescopic rods change their length thereby vertically scanning (elevating and lowering) pipes 654 so that the fluid jets cover different parts of the filtering unit.

Figure 27:
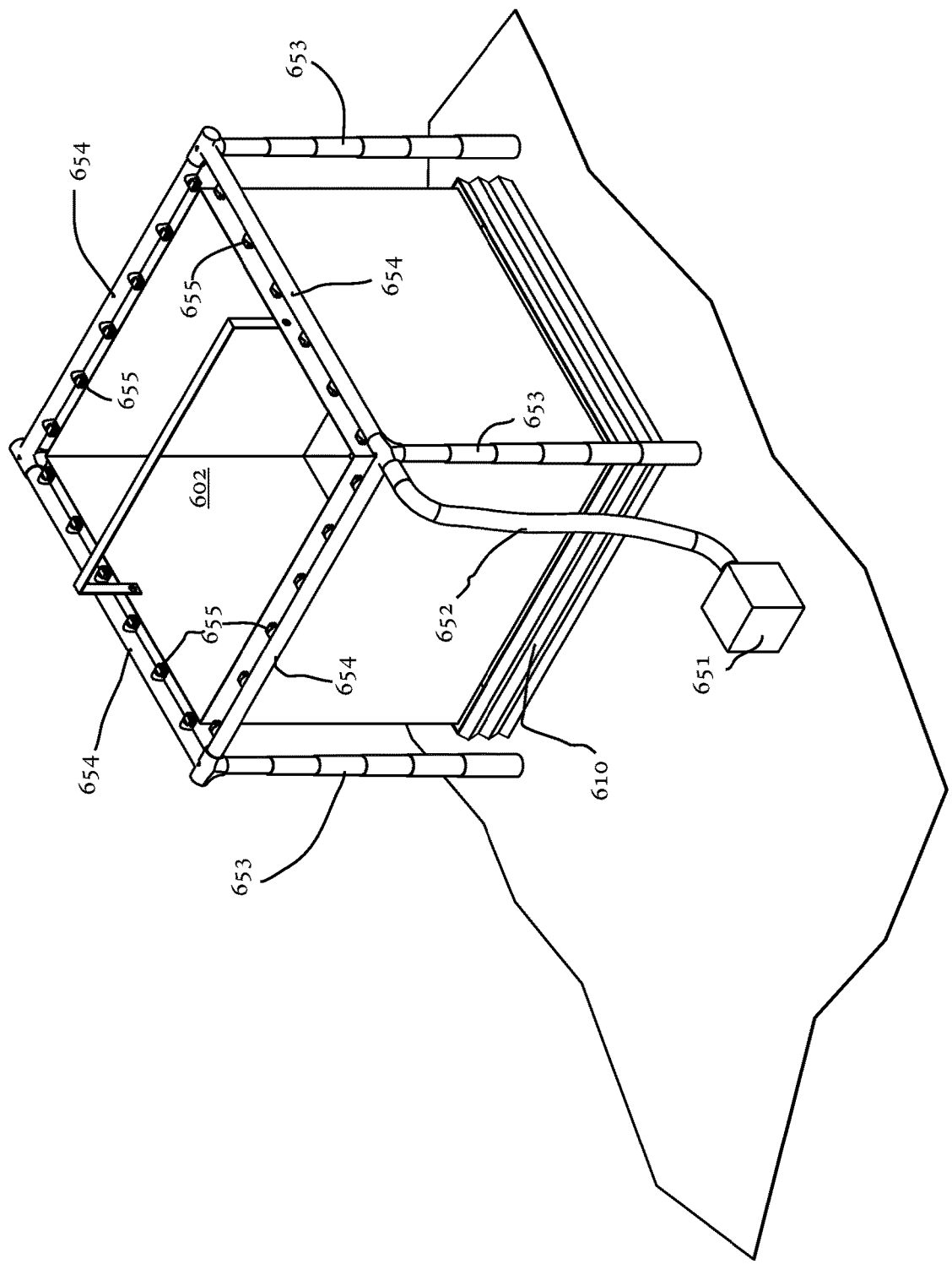
FIG. 27 illustrates a filtering unit and a backwash module of a pool cleaner according to an embodiment of the invention.

FIG. 27 illustrates filtering unit 602, fluid source 651, hose 652, pipes 654, jets or sprinklers 655 and telescopic rods 653. In FIG. 27 the filtering unit 602 has four facets (four sidewalls) and each facet faces a single pipe 654.

In FIG. 27 all four pipes 654 are connected to each other and are lowered and/or elevated simultaneously.

The backwash mechanism may or may not wash the debris trap 610 during the backwash process.

Figure 28:
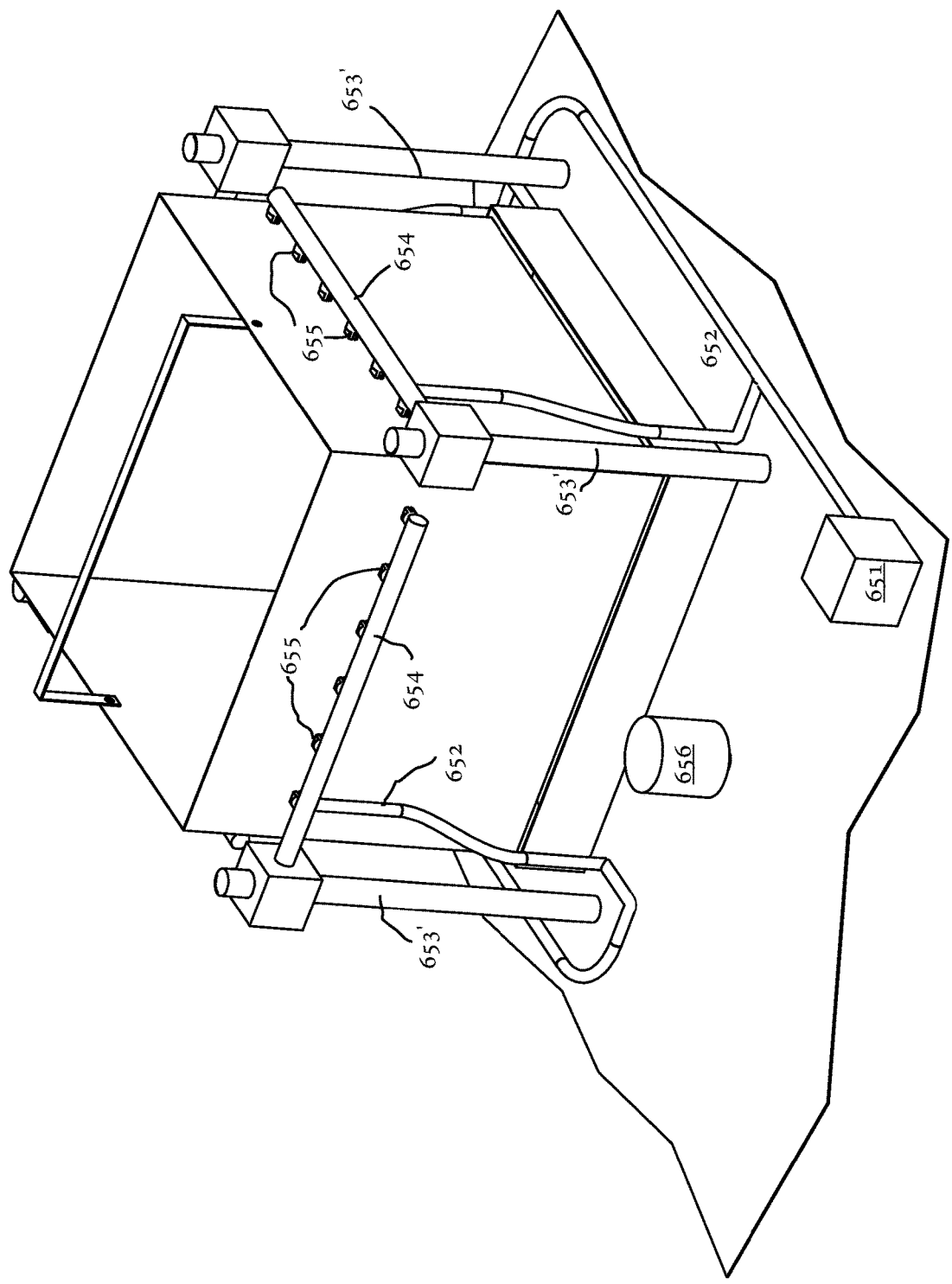
FIG. 28 illustrates a filtering unit and a backwash module of a pool cleaner according to an embodiment of the invention.

FIG. 28 illustrates filtering unit 602, fluid source 651, hose 652, pipes 654, jets or sprinklers 655 and scanning mechanisms 653'.

In FIG. 28 the filtering unit 602 has four facets (four sidewalls) and each facet faces a single pipe 654.

The backwash mechanism of FIG. 28 differs from the backwash mechanism of FIG. 27 by having pipes 654 that are separated from each other, by having a separate scanning mechanism for each of the pipes.

FIG. 28 also illustrates a motor 656 for controlling the rotation of the scanning mechanism. Motor 656 may be used to scan all of the scanning mechanisms. The same transmission mechanism may be used to convey the rotation of the motor 656 to one or more of the scanning mechanisms 653'.

The different scanning mechanisms 653' may be mechanically coupled to different motors (not shown).

Alternatively, at least one motor may be mechanically coupled by different transmission mechanisms to different scanning mechanisms 653'.

Figure 29:
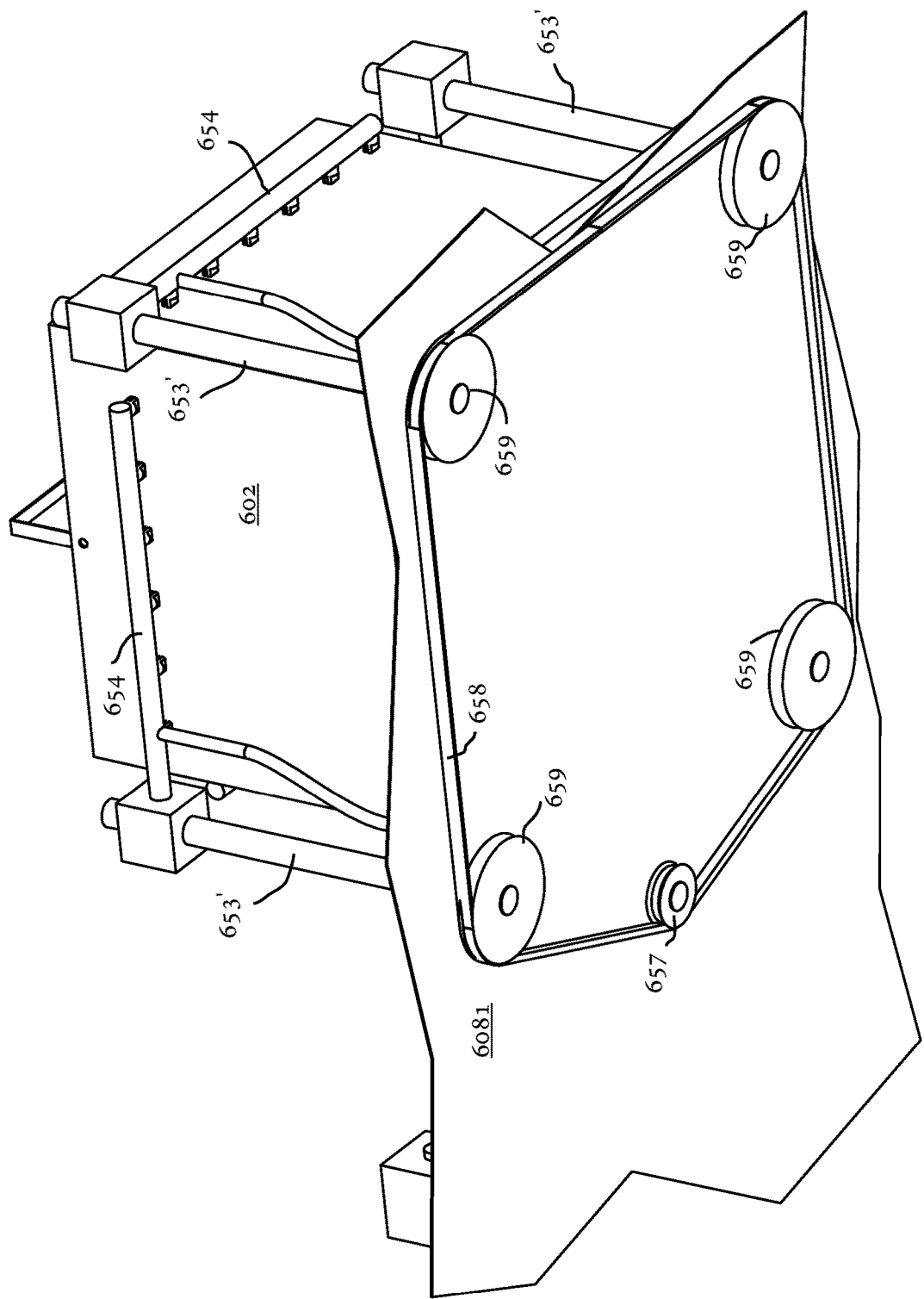
FIG. 29 illustrates a filtering unit and a backwash module of a pool cleaner according to an embodiment of the invention.

FIG. 29 illustrates a single motor 656 that is used to synchronize between the different scanning mechanisms 653'—motor rotates motor wheel 657 that is coupled (via timing belt 658) to scanning mechanism wheels 659 that rotate scanning mechanisms 653'. The scanning mechanisms 653' may include an endless screw that once rotated elevates pipes 654 until reaching a certain height and then the rotation is translated to a lowering of pipes 654. Alternatively, the motor 656 may rotate along a first rotational direction when elevating the scanning mechanisms 653' and rotate along an opposite rotational direction when lowering the scanning mechanisms 653'. The change of rotation of scanning mechanisms 653' may also be implemented using a mechanical gear (657, 659).

Motor 656 may be a hydraulic motor or a non-hydraulic motor. Fluid source motor 651 may perform the dual tasks of pumping water into pipes 654 and rotating scanning mechanism wheels/gears 659 (as an alternative to motor 656). In such an embodiment 651 may additionally include a backwash module computerized electronic control function (not shown).

Figure 30:
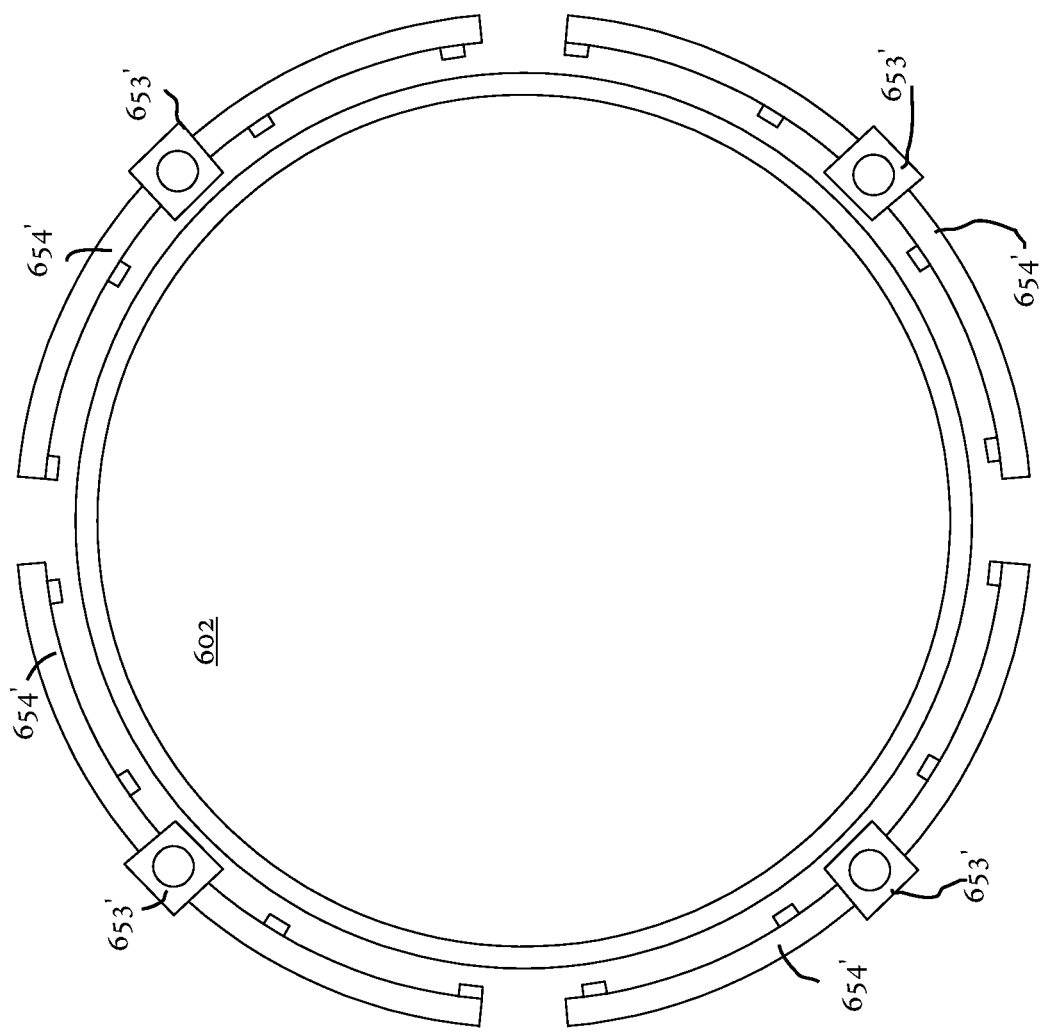
FIG. 30 is a cross section of a filtering unit and a backwash module of a pool cleaner according to an embodiment of the invention.

FIG. 30 illustrates a cross sectional view of a cylindrical filtering element 602 that is surrounded by arc-shaped pipes 654' that feed jets or sprinklers 655' and are scanned by scanning mechanism 653'. When filtering element is cylindrical, it may be further rotated around a central rotating shaft that may assist the backwash module by adding a in tandem centrifugal input that forces the debris and dirt particles onto the sidewalls of filter element 602.

It should be noted that the scanning mechanism may have other configurations.

For example—while the scanning mechanism shown in FIGS. 27-29 performs a vertical scan—the scanning mechanism may perform any scanning pattern—including a horizontal scan pattern, an oriented scan pattern (not vertical or horizontal), a non-linear scan pattern (for example a radial scan pattern)—or any other scan pattern.

For example—while FIGS. 27-29 illustrates pipes 654 that are horizontal—the fluid distribution elements may have other shapes and other orientations. For example—the fluid distribution elements may be non-linear, curved, and the like.

For example—the sprinklers may be arranged in a two-dimensional array, in a two-dimensional grid, in one or more columns, in an ordered array or a non-ordered array, and the like.

There may be provided multiple fluid sources. At least one fluid source may receive filtered fluid from the interior of the pool cleaner and/or from the fluid of the pool.

The jets or sprinklers may be the same, may differ from each other by shape and/or size.

The one or more fluid control elements may be configured to output fluid at a constant pressure or at a varying pressure, at pulsating pressures during a single scanning of the part of the filtering unit and/or the entire backwash process. The part of the filtering unit may be any part—for example a facet, a sidewall, a part of the sidewall, and the like.

The pressure level may be responsive to the location of the fluid control elements (for example—stronger jets at the top or bottom), to the state of the filtering unit (especially— the amount of clogging—for example stronger jets when the filter is more clogged), or a combination thereof.

The backwash mechanism may be included in a pool cleaner that does not have a debris trap. The backwash process may be executed over a drain of the pool, an underwater station, and the like. The debris trap may be replaced by a shredding unit.

Any combination of any pool cleaner of any of the figures and/or any paragraphs of the specification may be provided.

A method for operating any of the pool cleaners illustrated above may be provided.

FIG. 32 illustrates method 800 according to an embodiment of the invention.

Method 800 may include step 810 of performing a filtering operation by a pool cleaner that includes a drive mechanism for moving the pool cleaner, a housing that has a first fluid opening and a second fluid opening, a filtering unit that includes a filter enclosure and a filtering element and a fluid flow mechanism.

Step 810 includes inducing, by the fluid flow mechanism, a flow of fluid through the filtering element in a first direction during a filtering process.

Method 800 may also include step 820 of performing a backwash process of the filtering unit. Step 820 may include inducing, by the fluid flow mechanism, a flow of fluid through the filtering element at a substantially different direction during the backwash process. The substantially different direction may change from the first direction by at least twenty degrees—and may even differ by 160 to 200 degrees or more.

Step 820 may include step 822 of receiving, by a debris trap, debris from the filtering element during the backwash process. Step 822 may include substantially preventing the debris from exiting the debris trap during the filtering process.

Method 800 may include one or more repetitions of steps 810 and 820.

Step 820 may follow step 810 and/or may be executed in an overlapping or a partially overlapping manner to step 810.

The debris trap may be positioned below the filtering unit.

The debris trap may be positioned between the filtering unit and a bottom of the housing.

The debris trap and the filtering unit may be detachably connected to the housing.

The housing may include a housing upper part and a housing lower part; wherein the housing upper part may be rotationally coupled to the housing lower part.

Method 800 may include sensing, by a sensor of the pool cleaner, when the filtering element is clogged to a predefined level (in this predefined level the filter may be deemed "clogged", the predefined level may be defined by the manufacturer of the pool cleaner, by a user and the like).

Method 800 may also include triggering (for example by a controller of the pool cleaner) the backwash operation when the sensor senses that the filtering element is clogged to the predefined level.

The sensing may include sensing a pressure within the pool cleaner.

The sensing may include monitoring at least one of a pump motor and an impeller of the fluid flow mechanism.

The sensing can be made by any sensor—especially any sensor mentioned in the specification.

The debris trap and the filtering unit are fluidly coupled to each other by at least one flow element and method 800 may include facilitating a flow of debris from the filtering element to the debris trap and preventing a flow of debris from the debris trap to the filtering element during the backwash operation.

The at least one flow element may be a bi-directional conduit.

The at least one flow element may be a unidirectional valve.

The debris trap may include sidewalls.

The sidewalls may be elastic.

Method 800 may include expanding the sidewalls when the pool cleaner is in a backwash mode of flowing dirt into the debris trap The sidewalls may be partially elastic.

The sidewalls may be non-elastic.

The sidewalls may include concertina type bellows.

The sidewalls may include springs and the method may include using the springs to expand the sidewalls and using the springs to concentrate the sidewalls.

The debris trap may be non-expandable.

The debris trap may be expandable.

The method may include expanding the debris trap during the backwash process and retracting the debris trap after an and of the backwash process.

The method may include limiting the expansion of the debris trap by at least one limiter. The at least one limited may be the housing or any other object located at least partially within the housing.

Method 800 may include maintaining the pool cleaner stationary (no movement by the driving mechanism) during at least a part of the backwash process.

Method 800 may include moving the pool cleaner (movement by the driving mechanism) during at least a part of the backwash process.

The pool cleaner may include multiple pump motors. Method 800 may include using one pump motor of the multiple pump motors in the backwash process while using one or more other pump motor of the multiple pump motors in a filtering process.

The pool cleaner may include multiple impellers. Method 800 may include using one impeller of the multiple impellers in the backwash process while using one or more other impeller of the multiple impellers in a filtering process.

Step 810 may include rotating an impeller of the pool cleaner along a first rotational direction during the filtering process and step 820 may include rotating the impeller along a second rotational direction during the backwash process. The first rotational direction is opposite to the second rotational direction.

Step 820 may include inducing the flow of the fluid through the filtering element by using gravity.

The pool cleaner may include multiple filters. Step 810 may include using one filter of the multiple filters while step 820 may include using another filter—in an at least overlapping manner.

The pool cleaner may include multiple filters that are parallel to each other within the housing.

The pool cleaner may include multiple filters that are non-parallel to each other within the housing.

Step 820 may be executed in a continuous manner or in a non-continuous manner Step 820 may include using a fluid flow control element that is positioned outside the filtering element. The using may include directing fluid from the fluid control element that is positioned outside the filtering element towards the filtering unit sidewalls.

The flow control element may be a sprinkler.

Step 820 may include ejecting, by the flow control element, multiple fluid jets towards the filtering element.

Step 820 may include moving, by a scanning mechanism, the fluid control element in relation of to the filtering element during the backwash process.

Step 820 may include moving, by the scanning mechanism, the fluid control element thereby scanning a part of the filtering element with fluid from the fluid control element.

Step 820 may include moving, by the scanning mechanism, the fluid control element along a vertical axis.

Step 820 may include moving, by the scanning mechanism, the fluid control element along a non-vertical axis.

The scanning mechanism may include a hydraulic motor.

The scanning mechanism may include a non-hydraulic motor.

Step 820 may include outputting, by the fluid control element, fluid at a constant pressure during a single scanning of the part of the filtering unit.

Step 820 may include outputting, by the fluid control element, fluid at a varying pressure during a single scanning of the part of the filtering unit.

Step 820 may include outputting, by the fluid control element, fluid at a constant pressure during the backwash process.

Step 820 may include outputting, by the fluid control element, fluid at a varying pressure during the backwash process.

The fluid flow mechanism may include multiple fluid flow control elements that are positioned outside the filtering element and step 820 may include directing fluid by the multiple fluid flow control elements, towards the filtering unit.

The filtering unit may include multiple facets and wherein different fluid flow control elements face different facets.

Step 820 may include moving, by a scanning mechanism, the multiple fluid control elements in relation of to the filtering element during the backwash process.

Step 820 may include moving, by a scanning mechanism, at least two of the multiple fluid control elements in a mutual synchronized manner Step 820 may include moving, by a scanning mechanism, at least two of the multiple fluid control elements in a mutual unsynchronized manner.

The debris trap and the filtering unit are fluidly coupled to each other by a flow element that facilitates a gravitational flow of debris from the filtering element to the debris trap.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A pool cleaner comprising:
    a drive mechanism for moving the pool cleaner;
    a housing that has a first fluid opening and a second fluid opening;
    a filtering unit that comprises a filter enclosure and a filtering element; and
    a fluid flow mechanism for inducing a flow of fluid through the filtering unit in a first direction during a filtering process and for inducing a flow of the fluid through the filtering element at another direction during a backwash process;
    and wherein at least one of the following is true:
    (a) the fluid flow mechanism comprises a fluid flow control element that is positioned outside the filtering element and is configured to direct fluid towards filtering unit sidewalls, wherein the fluid flow control element is a sprinkler;

(b) the fluid flow mechanism comprises a fluid flow control element that is positioned outside the filtering element and is configured to direct fluid towards the filtering unit sidewalls, wherein the fluid flow control element is configured to eject multiple fluid jets towards the filtering element;

(c) the fluid flow mechanism comprises a fluid flow control element that is positioned outside the filtering element and is configured to direct fluid towards the filtering unit sidewalls, wherein the pool cleaner further comprising a scanning mechanism that is configured to move the fluid flow control element in relation of to the filtering element during the backwash process; and (d) the fluid flow mechanism comprises multiple fluid flow control elements that are positioned outside the filtering element and are configured to direct fluid towards the filtering unit.

2. The pool cleaner according to claim 1, further comprising a debris trap that is configured to receive debris from the filtering element; wherein the debris trap is positioned below the filtering unit.

3. The pool cleaner according to claim 1, further comprising a debris trap that is configured to receive debris from the filtering element wherein the debris trap is positioned between the filtering unit and a bottom of the housing.

4. The pool cleaner according to claim 1, further comprising a debris trap, wherein the debris trap and the filtering unit are detachably connected to the housing.

5. The pool cleaner according to claim 1, further comprising a debris trap that is configured to receive debris from the filtering element; wherein the housing comprises a housing upper part and a housing lower part; wherein the housing upper part is rotationally coupled to the housing lower part.

6. The pool cleaner according to claim 1, further comprising a sensor for sensing when the filtering element is clogged to a predefined level.

7. The pool cleaner according to claim 6 comprising a controller that is configured to trigger the backwash process when the sensor senses that the filtering element is clogged to the predefined level.

8. The pool cleaner according to claim 6 wherein the sensor is configured to sense a pressure within the pool cleaner.

9. The pool cleaner according to claim 6 wherein the sensor is configured to monitor at least one of a pump motor and an impeller of the fluid flow mechanism.

10. The pool cleaner according to claim 6 wherein the sensor is an optical sensor.

11. The pool cleaner according to claim 1, further comprising a debris trap that is configured to receive debris from the filtering element; wherein the debris trap and the filtering unit are fluidly coupled to each other by at least one flow element that facilitates a flow of debris from the filtering element to the debris trap and prevents a flow of debris from the debris trap to the filtering element during the backwash process.

12. The pool cleaner according to claim 11 wherein the at least one flow element is a uni-directional valve.

13. The pool cleaner according to claim 1, further comprising a debris trap that is configured to receive debris from the filtering element; wherein the debris trap comprises sidewalls.

14. The pool cleaner according to claim 13 wherein the sidewalls of the debris trap are elastically expandable.

15. The pool cleaner according to claim 13 wherein the sidewalls of the debris trap are configured to expand during the backwash process.

16. The pool cleaner according to claim 13 wherein the sidewalls of the debris trap are partially elastic.

17. The pool cleaner according to claim 13 wherein the sidewalls of the debris trap are non-elastic.

18. The pool cleaner according to claim 13 wherein the sidewalls of the debris trap comprise concertina type bellows.

19. The pool cleaner according to claim 13 wherein the sidewalls of the debris trap are shaped to have a cross section of a spring.

20. The pool cleaner according to claim 1, further comprising a debris trap that is configured to receive debris from the filtering element; wherein the debris trap is non-expandable.

21. The pool cleaner according to claim 1, further comprising a debris trap that is configured to receive debris from the filtering element; wherein the debris trap is expandable.

22. The pool cleaner according to claim 21, wherein the debris trap is configured to expand after the backwash process and to retract after an end of a cleaning cycle process.

23. The pool cleaner according to claim 21 comprising at least one limiter for limiting an expansion of the debris trap, wherein the at least one limiter is the housing.

24. The pool cleaner according to claim 1 wherein the pool cleaner is configured to be stationary during the backwash process.

25. The pool cleaner according to claim 1 wherein the pool cleaner is configured to move during the backwash process.

26. The pool cleaner according to claim 1, wherein the fluid flow mechanism comprises multiple pumps; wherein one pump motor of the multiple pump motors is configured to participate in the backwash process while another pump motor of the multiple pump motors is configured to participate in the filtering process.

27. The pool cleaner according to claim 1, wherein the fluid flow mechanism comprises multiple impellers; wherein one impeller of the multiple impellers is configured to participate in the backwash process while another impeller of the multiple impellers is configured to participate in the filtering process.

28. The pool cleaner according to claim 1 whereby the fluid flow mechanism comprises an impeller; wherein the impeller rotates along a first rotational direction during the filtering process and rotates along a second rotational direction during the backwash process; wherein the first rotational direction is opposite to the second rotational direction.

29. The pool cleaner according to claim 1 wherein the fluid flow mechanism is configured to induce the flow of the fluid through the filtering element at a substantially opposite direction during the backwash process by using gravity.

30. The pool cleaner according to claim 1, further comprising multiple filters; wherein one filter of the multiple filters is configured to participate in the backwash process while another filter of the multiple filters is configured to participate in a filtering process.

31. The pool cleaner according to claim 1, further comprising multiple filters that are parallel to each other within the housing.

32. The pool cleaner according to claim 1, further comprising multiple filters that are non-parallel to each other within the housing.

33. The pool cleaner according to claim 1 wherein the backwash process is performed in a continuous manner.

34. The pool cleaner according to claim 1 wherein the backwash process is performed in a non-continuous manner.

35. The pool cleaner according to claim 1, further comprising a debris trap that is configured to receive debris from the filtering element; wherein the fluid flow mechanism comprises a fluid flow control element that is positioned outside the filtering element and is configured to direct fluid towards the filtering unit sidewalls.

36. The pool cleaner according to claim 35 wherein the fluid flow control element is the sprinkler.

37. The pool cleaner according to claim 35 wherein the fluid flow control element is configured to eject the multiple fluid jets towards the filtering element.

38. The pool cleaner according to claim 35 further comprising the scanning mechanism that is configured to move the fluid flow control element in relation to the filtering element during the backwash process.

39. The pool cleaner according to claim 38 wherein the scanning mechanism is configured to move the fluid flow control element thereby scanning a part of the filtering element with fluid from the fluid flow control element.

40. The pool cleaner according to claim 38 wherein the scanning mechanism is configured to move the fluid flow control element along a vertical axis.

41. The pool cleaner according to claim 38 wherein the scanning mechanism is configured to move the fluid flow control element along a non-vertical axis.

42. The pool cleaner according to claim 38 wherein the scanning mechanism comprises a hydraulic motor.

43. The pool cleaner according to claim 38 wherein the scanning mechanism comprises a non-hydraulic motor.

44. The pool cleaner according to claim 35 wherein the pool cleaner comprises the scanning mechanism; and wherein the fluid flow control element is configured to output fluid at a constant pressure during a single scanning, by the scanning mechanism, of a part of the filtering unit.

45. The pool cleaner according to claim 38 wherein the fluid flow control element is configured to output fluid at a varying pressure during a single scanning of a part of the filtering unit.

46. The pool cleaner according to claim 35 wherein the fluid flow control element is configured to output fluid at a constant pressure during the backwash process.

47. The pool cleaner according to claim 35 wherein the fluid flow control element is configured to output fluid at a varying pressure during the backwash process.

48. The pool cleaner according to claim 1, further comprising a debris trap that is configured to receive debris from the filtering element; wherein the fluid flow mechanism comprises the multiple fluid flow control elements that are positioned outside the filtering element and are configured to direct fluid towards the filtering unit.

49. The pool cleaner according to claim 48 wherein the filtering unit comprises the multiple external facets that belong to an exterior of the filtering unit, and wherein different fluid flow control elements face different facets.

50. The pool cleaner according to claim 48 further comprising the scanning mechanism that is configured to move the multiple fluid flow control elements in relation 4 to the filtering element during the backwash process.

51. The pool cleaner according to claim 50 wherein the scanning mechanism is configured to move at least two of the multiple fluid flow control elements in a mutual synchronized manner.

52. The pool cleaner according to claim 50 wherein the scanning mechanism is configured to move at least two of the multiple fluid flow control elements in a mutual unsynchronized manner.

53. The pool cleaner according to claim 1 further comprising a debris trap, wherein the debris trap and the filtering unit are fluidly coupled to each other by a flow element that facilitates a gravitational flow of debris from the filtering element to the debris trap.

* * * * *